(12) United States Patent
Kurashige

(10) Patent No.: US 11,112,080 B2
(45) Date of Patent: Sep. 7, 2021

(54) ILLUMINATION DEVICE INCLUDING COHERENT LIGHT SOURCE TO ILLUMINATE AN ILLUMINATION AREA

(71) Applicant: Dai Nippon Printing Co., Ltd., Tokyo (JP)

(72) Inventor: Makio Kurashige, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 16/809,974

(22) Filed: Mar. 5, 2020

(65) Prior Publication Data

US 2020/0200331 A1 Jun. 25, 2020

Related U.S. Application Data

(63) Continuation of application No. 15/735,780, filed as application No. PCT/JP2016/068527 on Jun. 22, 2016, now Pat. No. 10,627,053.

(30) Foreign Application Priority Data

Jun. 22, 2015 (JP) .............................. JP2015-124992
Jun. 22, 2015 (JP) .............................. JP2015-124997

(51) Int. Cl.
*F21S 41/16* (2018.01)
*G02B 27/48* (2006.01)
(Continued)

(52) U.S. Cl.
CPC .............. *F21S 41/16* (2018.01); *F21K 9/233* (2016.08); *F21K 9/60* (2016.08); *F21S 41/176* (2018.01);
(Continued)

(58) Field of Classification Search
CPC ......... F21S 41/16; F21S 41/176; F21K 9/233; F21K 9/60; F21V 5/02; F21V 5/04; G02B 26/12; G02B 27/48
(Continued)

(56) References Cited

U.S. PATENT DOCUMENTS 9,777,901 B2   10/2017  Reinprecht et al.
2008/0117491 A1  5/2008  Robinson
(Continued)

FOREIGN PATENT DOCUMENTS

EP    2 615 502 A1    7/2013
JP    2010-510643 A1  4/2010
(Continued)

OTHER PUBLICATIONS

English Translation of JP 2012-123381 A (Jun. 2012).*
(Continued)

*Primary Examiner* — Rajarshi Chakraborty
*Assistant Examiner* — Hana S Featherly
(74) *Attorney, Agent, or Firm* — Burr & Brown, PLLC

(57) ABSTRACT

An illumination device includes a light diffusion device including element diffusion devices that diffuse incident light, a coherent light source that emits coherent light, a shaping optical system that shapes the coherent light, a scanner that adjusts a traveling direction of the coherent light so as to allow the coherent light to scan the light diffusion device, and a light condensing optical system located on a light path of the coherent light from the shaping optical system up to the light diffusion device. The light condensing optical system condenses the coherent light such that a spot area on the light diffusion device is smaller than the element diffusion device. Each element diffusion device (Continued)

diffuses the coherent light incident thereon so as to illuminate an element illumination area corresponding to the element diffusion device.

17 Claims, 11 Drawing Sheets

(51) Int. Cl.
    *G02B 26/12* (2006.01)
    *F21S 41/176* (2018.01)
    *F21V 5/02* (2006.01)
    *F21V 5/04* (2006.01)
    *F21K 9/233* (2016.01)
    *F21K 9/60* (2016.01)

(52) U.S. Cl.
    CPC .............. *F21V 5/02* (2013.01); *F21V 5/04* (2013.01); *G02B 26/12* (2013.01); *G02B 27/48* (2013.01)

(58) Field of Classification Search
    USPC ........................................ 362/553
    See application file for complete search history.

(56) References Cited

U.S. PATENT DOCUMENTS

| | | | |
|---|---|---|---|
| 2011/0043876 A1* | 2/2011 | Kurashige | G02B 27/48 359/15 |
| 2011/0317130 A1 | 12/2011 | Gollier | |
| 2013/0170007 A1 | 7/2013 | Kurashige et al. | |
| 2014/0092321 A1 | 4/2014 | Kurashige | |
| 2015/0036108 A1 | 2/2015 | Taniguchi et al. | |
| 2015/0055100 A1 | 2/2015 | Kaneda | |
| 2015/0369440 A1 | 12/2015 | Reinprecht et al. | |

FOREIGN PATENT DOCUMENTS

| | | |
|---|---|---|
| JP | 2012-123381 A1 | 6/2012 |
| JP | 2012-123382 A1 | 6/2012 |
| JP | 2012-146621 A1 | 8/2012 |
| JP | 2012-226274 A1 | 11/2012 |
| JP | 2014-016396 A1 | 1/2014 |
| JP | 2014-146542 A1 | 8/2014 |
| WO | 2012/033174 A1 | 3/2012 |
| WO | 2014/121314 A1 | 8/2014 |
| WO | 2014/121315 A1 | 8/2014 |

OTHER PUBLICATIONS

International Search Report and Written Opinion (Application No. PCT/JP2016/068527) dated Sep. 27, 2016.

English translation of International Preliminary Report on Patentability (Chapter I) (Application No. PCT/JP2016/068527) dated Dec. 26, 2017.

Extended European Search Report (Application No. 16814398.0) dated Feb. 5, 2019.

Japanese Office Action (Application No. 2017-100012) dated Feb. 19, 2019 (with English translation).

* cited by examiner

ILLUMINATION DEVICE INCLUDING COHERENT LIGHT SOURCE TO ILLUMINATE AN ILLUMINATION AREA

CROSS REFERENCE TO RELATED APPLICATIONS

This application is a continuation of U.S. application Ser. No. 15/735,780, filed Dec. 12, 2017, which in turn is the National Stage entry of International Application No. PCT/JP2016/068527, filed Jun. 22, 2016, which designated the United States, the entireties of which are incorporated herein by reference.

FIELD OF THE INVENTION

The present invention relates to an illumination device that illuminates a predetermined area by using light.

BACKGROUND OF THE INVENTION

As disclosed in JP2012-146621A, for example, an illumination device using a coherent light source is widely used. A laser light source that oscillates laser light (laser beam) is typically used as the coherent light source.

JP2012-146621A discloses a vehicle lighting tool. The vehicle lighting tool includes a light source, which can be formed by a laser oscillation device, and four hologram devices. The respective hologram devices are moved by a rotating and driving apparatus to be located on positions where they can receive laser light from the light source. The respective hologram devices diffract the laser light to achieve illumination in a desired light distribution pattern. By suitably selecting a hologram device which is irradiated with laser light, illumination in a predetermined light distribution pattern can be achieved. In the vehicle lighting tool, in order to prevent that an unintended area is irradiated with illumination light, it is necessary to control irradiation of laser light while the locations of the four hologram devices are changed. In this case, a period of time in which the light source stops emission of light becomes long. Thus, it is impossible to sufficiently utilize performance of the light source so as to illuminate an illumination area with a sufficiently bright quantity of light.

SUMMARY OF THE INVENTION

The present invention has been made in consideration of the above point. The first object of the present invention is to provide an illumination device that can sufficiently utilize performance of a coherent light source so as to brightly illuminate an illumination area in a desired light distribution pattern.

In addition, the present invention has been made in consideration of the above point, and the second object thereof is to provide an illumination device that can sufficiently utilize performance of a light source, which is not limited to a coherent light source, so as to brightly illuminate an illumination area in a desired light distribution pattern.

An illumination device according to a first embodiment of the present invention is an illumination device comprising:
a light diffusion device including element diffusion devices that diffuse incident light;
a coherent light source that emits coherent light;
a shaping optical system that shapes the coherent light;

a scanner that adjusts a traveling direction of the coherent light so as to allow the coherent light to scan the light diffusion device; and
a light condensing optical system located on a light path of the coherent light from the shaping optical system up to the light diffusion device;
wherein:
the light condensing optical system condenses the coherent light such that a spot area on the light diffusion device is smaller than the element diffusion device; and
each element diffusion device diffuses the coherent light incident thereon so as to illuminate an element illumination area corresponding to the element diffusion device.

In the illumination device according to the first embodiment of the present invention,
the shaping optical system may divide the coherent light emitted from the coherent light source into light fluxes; and
the light condensing optical system may adjust light paths of the light fluxes such that the light fluxes are overlapped at least partially on the light diffusion device.

In the illumination device according to the first embodiment of the present invention, the light condensing optical system may include a lens, and the light diffusion device may be located on a focus position of the lens.

In the illumination device according to the first embodiment of the present invention, the shaping optical system may include a collimation lens, and a lens array located on a light path from the collimation lens up to the light condensing optical system.

In the illumination device according to the first embodiment of the present invention,
the lens array may include element lenses; and
light fluxes emergent from the element lenses may have the same light distributions.

In the illumination device according to the first embodiment of the present invention, the shaping optical system may have a beam homogenizer.

The illumination device according to the first embodiment of the present invention may further comprise an emission control unit that controls emission of the coherent light from the coherent light source.

In the illumination device according to the first embodiment of the present invention, the emission control unit may control emission of the coherent light of the coherent light source, depending on an irradiation position of the coherent light on the light diffusion device.

In the illumination device according to the first embodiment of the present invention,
the light diffusion device may have a hologram storage medium; and
the element diffusion devices may be element holograms having interference fringe patterns different from one another.

In the illumination device according to the first embodiment of the present invention,
the light diffusion device may have a lens array group including a plurality of lens arrays; and
the element diffusion devices may have the lens arrays.

According to the first embodiment of the present invention, the illumination device can sufficiently utilize performance of the coherent light source so as to brightly illuminate an illumination area in a desired light distribution pattern.

An illumination device according to a second embodiment of the present invention is an illumination device comprising:

a light deflection device including element deflection devices that adjust a traveling direction of incident light;

a light source;

a diffusion optical system that diffuses light-source light emitted by the light source;

a scanner that adjusts a traveling direction of the light-source light so as to allow the light-source light to scan the light deflection device; and a light condensing optical system located on a light path of the light-source light from the diffusion optical system up to the light deflection device;

wherein:

the light condensing optical system condenses the light-source light such that a spot area on the light deflection device is smaller than the element deflection device; and each element deflection device adjusts a traveling direction of the light-source light incident thereon so as to illuminate an element illumination area corresponding to the element deflection device.

In the illumination device according to the second embodiment of the present invention, the light diffusion optical system may divide the light-source light into light fluxes; and the light condensing optical system may adjust light paths of the light fluxes such that the light fluxes are overlapped at least partially on the light deflection device.

In the illumination device according to the second embodiment of the present invention, the light condensing optical system may include a lens, and the light deflection device may be located on a focus position of the lens.

In the illumination device according to the second embodiment of the present invention, the diffusion optical system may include a collimation lens, and a lens array located on a light path from the collimation lens up to the light condensing optical system.

In the illumination device according to the second embodiment of the present invention, the lens array may include element lenses; and light fluxes emergent from the element lenses may have the same light distributions.

In the illumination device according to the second embodiment of the present invention, the diffusion optical system may have a beam homogenizer.

The illumination device according to the second embodiment of the present invention may further comprise an emission control unit that controls emission of the light from the light-source.

In the illumination device according to the second embodiment of the present invention, the emission control unit may control emission of light from the light-source, depending on an irradiation position of the light-source light on the light deflection device.

In the illumination device according to the second embodiment of the present invention, the light deflection device may have a diffraction grating array; and each element deflection device may be diffraction grating.

In the illumination device according to the second embodiment of the present invention, the light deflection device may have a prism array; and each element deflection device may be prism.

According to the second embodiment of the present invention, the illumination device can sufficiently utilize performance of the light-source so as to brightly illuminate an illumination area in a desired light distribution pattern.

DETAILED DESCRIPTION OF THE INVENTION

Figure 1:
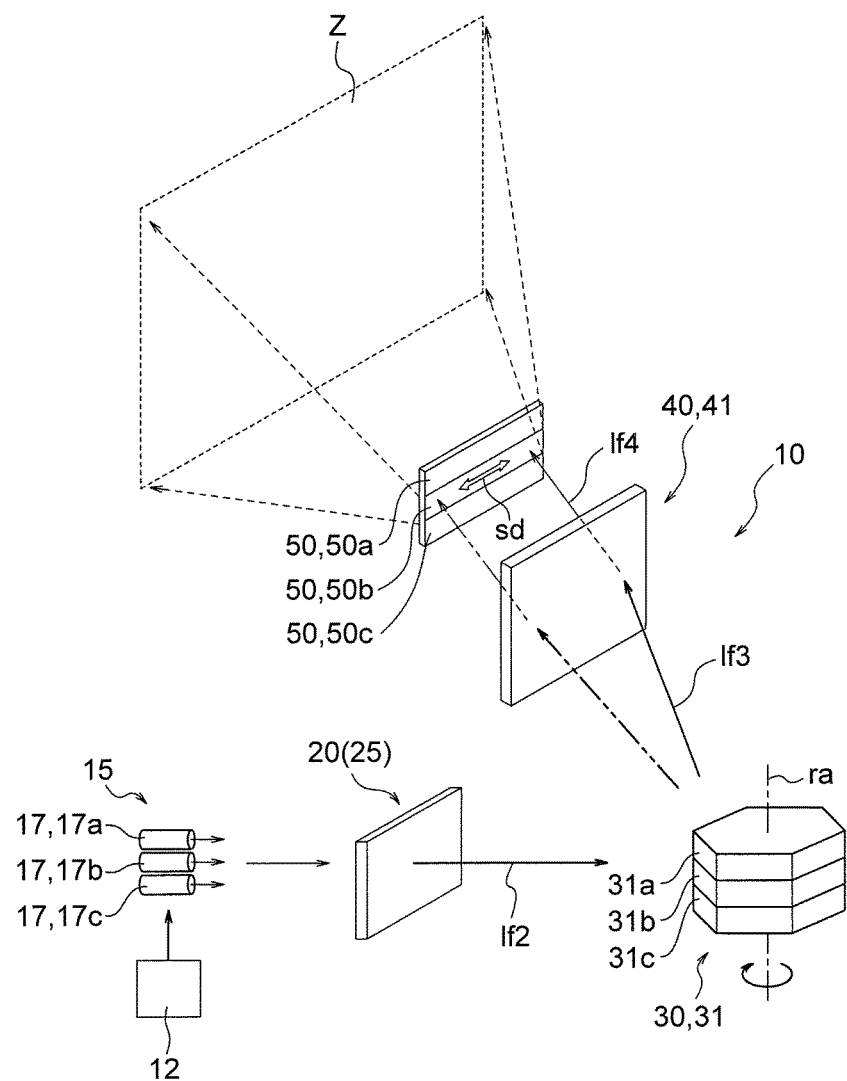
FIG. 1 is a perspective view schematically showing an overall structure of an illumination device, for explaining a first embodiment of the present invention.

Embodiments of the present invention will be described herebelow with reference to the drawings. In the drawings attached to the specification, a scale size, an aspect ratio and so on are changed and exaggerated from the actual ones, for the convenience of easiness in illustration and understanding.

Further, terms specifying shapes, geometric conditions and their degrees, e.g., "parallel", "perpendicular/orthogonal", "same", etc., are not limited to their strict definitions, but are to be construed to include a range capable of exerting a similar function.

A first embodiment is firstly described with reference to an example shown in FIGS. 1 to 6.

FIG. 1 is a perspective view schematically showing an overall structure of an illumination device 10. The illumination device 10 illuminates an illumination area Z by using coherent light. The illumination device 10 includes a laser light source 15 functioning as a coherent light source. The laser light source 15 oscillates laser light (laser beam) which is an example of coherent light. The illumination device 10 includes a shaping optical system 20, a scanner 30, a light condensing optical system 40 and a light diffusion device 50, which process light emitted from the laser light source 15. In the example shown in FIG. 1, the shaping optical system 20, the scanner 30, the light condensing optical system 40 and the light diffusion device 50 are located in this order along a light path of laser light from the laser light source 15, and they process laser light in this order. As described in detail below, the illumination device 10 described herein can illuminate, with a large quantity of light, the illumination area Z in a desired light distribution pattern, while sufficiently utilizing the performance of the coherent light source by means of optical actions in the shaping optical system 20 and the light condensing optical system 40. Herebelow, the respective constituent elements are sequentially described.

In the example shown in FIG. 1, the laser light source 15 has a plurality of light source units 17 that emit laser light. The light source units 17 may be independently arranged, or may be a light source module formed by arranging the light source units 17 side by side on a common substrate. For example, the light source units 17 have a first light source unit 17a that oscillates light of a red emission wavelength range, a second light source unit 17b that oscillates light of a green emission wavelength range, and a third light source unit 17c that oscillates light of a blue emission wavelength range. According to this example, since three laser lights (laser beams) emitted from the light source units 17a, 17b and 17c are overlapped, illumination beams of various colors including a white illumination beam can be generated.

Although an example in which the laser light source 15 has the three light source units 17a, 17b and 17c having emission wavelength ranges different from one another is described herebelow, the present invention is not limited thereto. The laser light source 15 may have two light units 17 having emission wavelength ranges different from each other, or four or more light units 17 having emission wavelength ranges different from one another. In addition, in order to increase emission intensity, a plurality of the light source units 17 may be provided for each emission wavelength range.

As shown in FIG. 1, the illumination device 10 includes an emission control unit 12 connected to the laser light source 15. The emission control unit 12 controls emission timings of laser lights (laser beams) emitted by the laser light source 15. In particular, the emission control unit 12 can switch emission of laser lights and stop of emission of laser lights from the light source unit 17a, 17b or 17c, independently from other light source units. The control of emitting or not emitting laser lights by the emission control unit 12 is carried out based on scanning timings of a plurality of laser lights by the scanner 30, in other words, based on incident positions of laser lights on the light diffusion device 50. As described above, in the case where the laser light source 15 can emit three laser lights, i.e., a red laser light, a blue laser light and a green laser light, it is possible to generate illumination light of a color that is a combination of given two or more colors of red, blue and green, by controlling an emission timing of each laser light.

The emission control unit 12 may control whether a laser light is emitted from each light source unit 17 or not, i.e., ON/OFF of emission, or may switch blocking or not blocking of a light path of a laser light having been emitted from each light source unit 17. In the latter case, light shutter units, not shown, may be disposed between the respective light source units 17 and the shaping optical system 20, such that passage and blockage of laser light can be switched by the light shutter units.

Next, the shaping optical system 20 is described. The shaping optical system 20 shapes laser light emitted from the laser light source 15. In other words, the shaping optical system 20 shapes a cross-sectional shape of laser light orthogonal to an optical axis, and a three-dimensional shape of a light flux of laser light.

Figure 2:
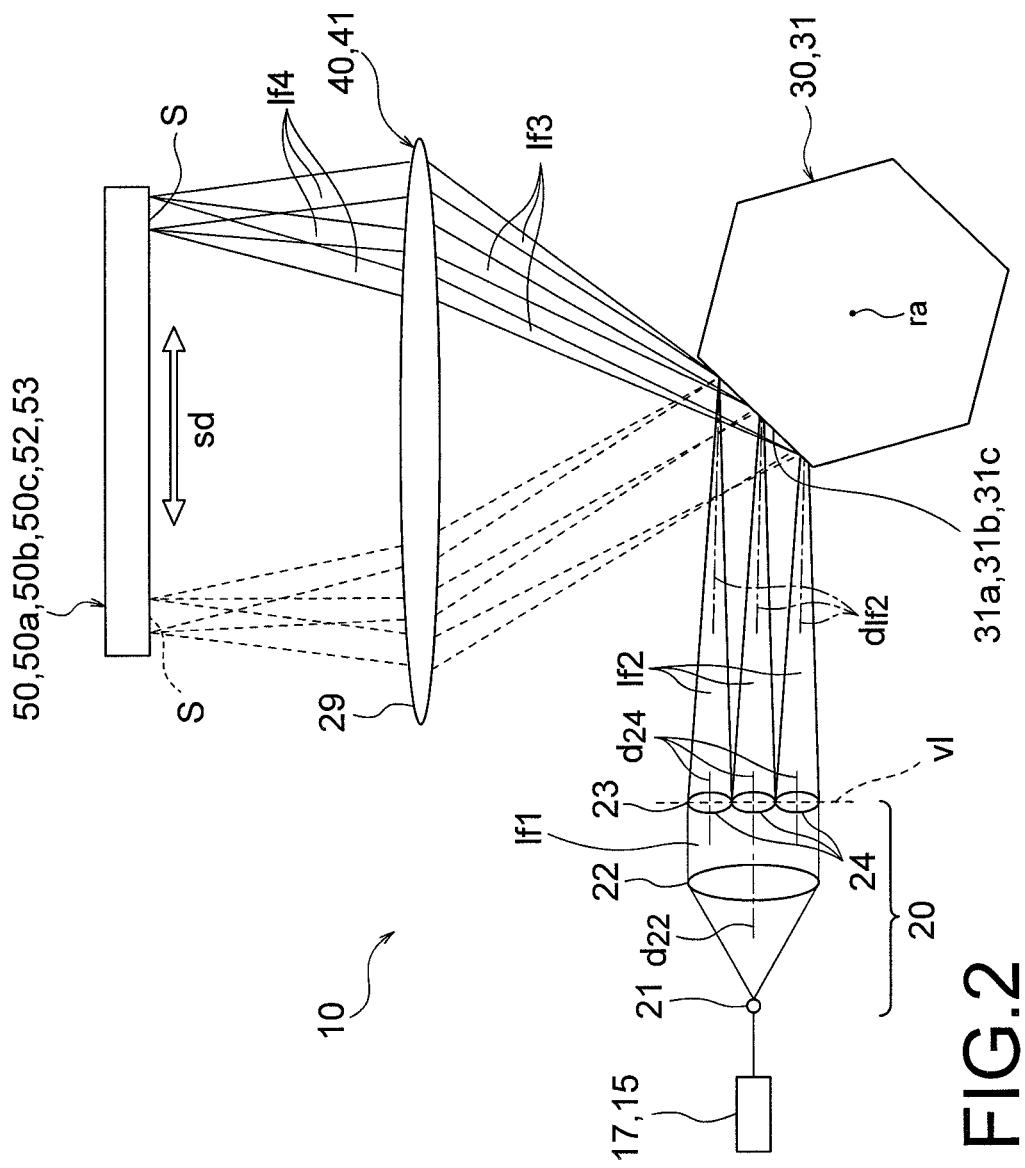
FIG. 2 is a plan view showing the illumination device of FIG. 1.

FIG. 2 is a plan view showing the illumination device 10. As shown in FIG. 2, the shaping optical system 20 includes a beam expander 21, a collimation lens 22 and a lens array 23, in this order along a light path of laser light. The beam expander 21 shapes a laser light emitted from the laser light source 15 into a divergent light flux. The collimation lens 22 reshapes the divergent light flux generated by the beam expander 21 into parallel light fluxes lf1. The lens array 23 includes a plurality of element lenses 24 that are arranged on positions facing the collimation lens 22. The element lenses 24 are positioned such that an optical axis $d_{24}$ of each element lens 24 is parallel to an optical axis $d_{22}$ of the collimation lens 22. In addition, the element lenses 24 are arranged on a virtual face vl that is orthogonal to the optical axis $d_{22}$ of the collimation lens 22. Each element lens 24 shapes a parallel light flux lf1, which has been shaped by the collimation lens 22 and has entered the element lens 24, into a convergent light flux lf2.

In the example shown in FIG. 2, the shaping optical system 20 divides a laser light emitted from the laser light source 15 into a plurality of light fluxes lf2. The shaping optical system 20 divides a laser light into light fluxes lf2 the number of which is equal to the number of the element lenses 24 included in the lens array 23. In the illustrated example, each element lens 24 shapes a parallel light flux lf1, which has been shaped by the collimation lens 22 and has entered the element lens 24, into a convergent light flux lf2. That is to say, respective light fluxes lf2 divided by the shaping optical system 20 are convergent light fluxes. In addition, in the illustrated example, the element lenses 24 have the same structures each other. Thus, light fluxes lf2 emitted from the element lenses 24 are the same light distributions. For example, the light fluxes lf2 have the same convergent angles and the same convergent positions, and optical axes $d_{lf2}$ of the light fluxes lf2 are parallel to one another.

A plurality of the shaping optical systems 20 may be provided correspondingly to the respective light source units 17 included in the laser light source 15. Alternatively, the single shaping optical system 20 capable of adjusting light paths of laser lights from the light source units 17a, 17b and 17c may be provided. In the example shown in FIG. 2, the light source units 17a, 17b and 17c may be aligned in the depth direction of the sheet plane of FIG. 2, the beam expander 21 may diverge a laser light only in a plane of the sheet plane of FIG. 2, and the collimation lens 22 and the element lenses 24 of the lens array 23 in the shaping optical system 20 may respectively be formed as cylindrical lenses extending to have a certain cross-sectional shape in the depth direction of the sheet plane of FIG. 2. According to this example, the light source units 17 can share the collimation lens 22 and the lens array 23.

Figure 3:
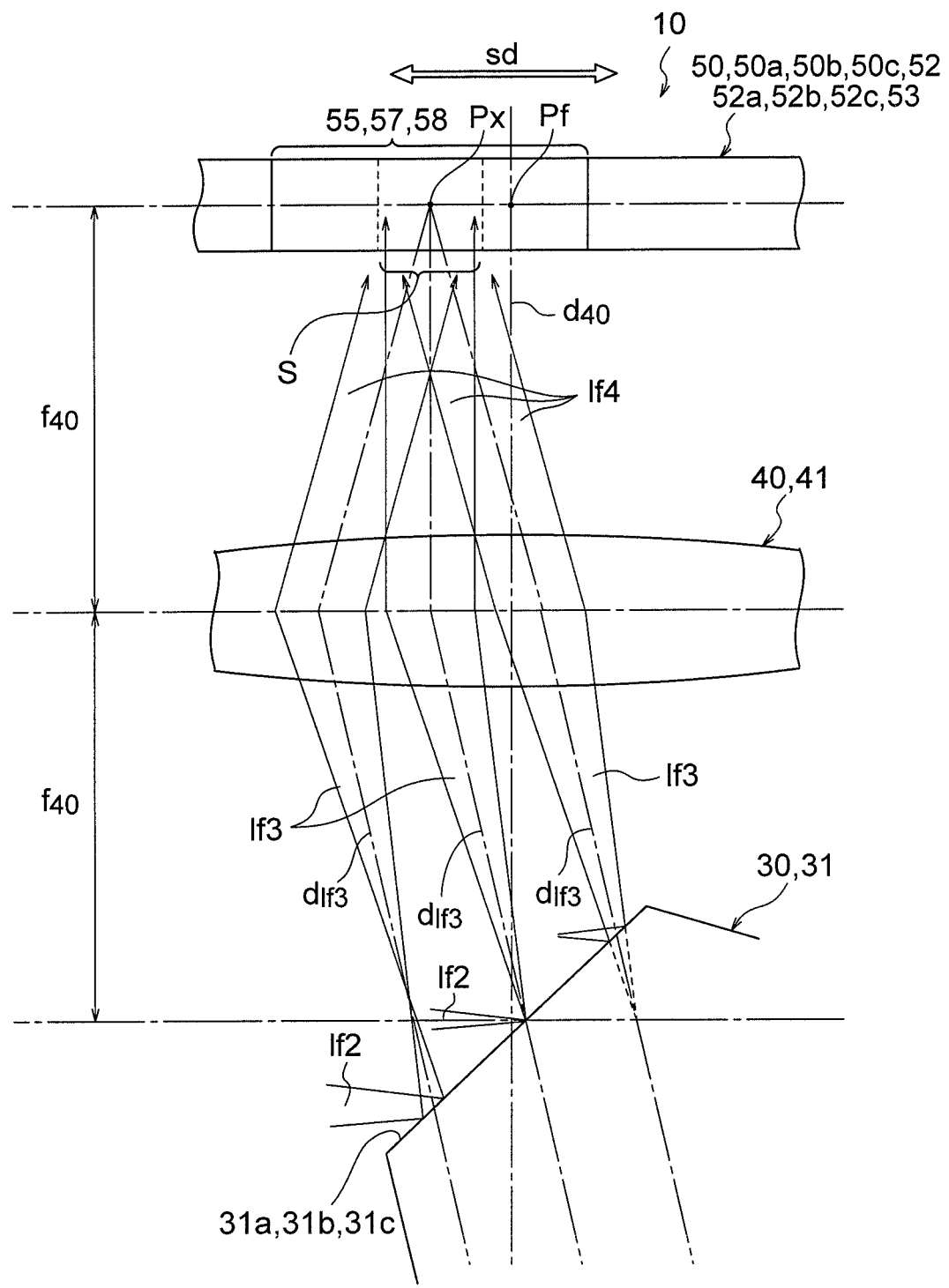
FIG. 3 is a plan view showing a scanner, a light condensing optical system and a light diffusion device of the illumination device of FIG. 1, mainly for explaining a function of the light condensing optical system.

Next, the scanner 30 is described. The scanner 30 adjusts a traveling direction of a laser light emitted from the laser light source 15. The scanner 30 changes a traveling direction of a laser light over time. Due to the light path adjustment of the scanner 30, a laser light emitted from the laser light source 15 scans the light diffusion device 50. In the example shown in FIGS. 1 and 2, the scanner 30 is formed as a polygonal mirror 31 having six reflection surfaces. When the polygonal mirror 31 is rotated about its central axis line as a rotational axis line ra, a reflection direction of light that has entered there from a certain direction can be changed cyclically. The respective six reflection surfaces of the polygonal mirror 31 are formed as flat surfaces. Thus, as shown in FIG. 3, after three light fluxes lf3, which had been shaped by the shaping optical system 20, have been reflected by the polygonal mirror 31 so that their traveling directions have been changed, optical axes $d_{lf3}$ of the light fluxes lf3 remain parallel. FIG. 3 is a partially enlarged plan view showing a light path from the scanner 30 up to the light diffusion device 50.

In particular, in the illustrated example, the light source units 17a, 17b and 17c are aligned in a direction parallel to the rotational axis line ra of the polygonal mirror 31 (see FIG. 1). The reflection surface of the polygonal mirror 31 includes, along this rotational axis line ra, a first reflection unit 31a, a second reflection unit 31b and a third reflection unit 31c. The first reflection unit 31a reflects a laser light emitted from the first light source unit 17a and cyclically changes a traveling direction of the laser light in a plane orthogonal to the rotational axis line ra. In addition, the second reflection unit 31b reflects a laser light emitted from the second light source unit 17b, and the third reflection unit 31c reflects a laser light emitted from the third light source unit 17c.

As shown in FIG. 2, the polygonal mirror 31 is positioned with respect to the shaping optical system 20, such that the polygonal mirror 31 reflects light from the shaping optical system 20 on a focus position of each element lens 24 of the lens array 23, or on a position close thereto. Thus, as shown in FIG. 3, light reflected from the polygonal mirror 31 substantially becomes a divergent light flux lf3 whose divergent point is the reflection surface of the polygonal mirror 31.

The scanner 30 is not limited to the illustrated polygonal mirror 31. It is possible to use, as the scanner 30, an apparatus that three-dimensionally changes in a biaxial direction a traveling direction of light incident thereon from a certain direction. For example, MEMS (micro electromechanical systems) such as a digital micromirror device (DMD) may be used as the scanner 30.

Next, the light condensing optical system 40 is described. The light condensing optical system 40 is located on a light path of a laser light from the shaping optical system 20 up to the light diffusion device 50. The light condensing optical system 40 optically processes a laser light having been shaped by the shaping optical system 20. The light condensing optical system 40 condenses the laser light, such that a spot area S on the light diffusion device 50, i.e., an area, which is irradiated with a laser light on the light diffusion device 50 at a certain instance, has a smaller planar dimension.

In the illustrated example, the light condensing optical system 40 is formed by a light condensing lens 41 having a focus Pf. The light condensing lens 41 is located on a light path of a laser light from the saner 30 toward the light diffusion device 50. As described above, the shaping optical system 20 divides a laser light into a plurality of light fluxes lf3. As shown in FIG. 3, the optical axes $d_{lf3}$ of the light fluxes lf3 are parallel to one another. Thus, as shown in FIG. 3, because of a lens action of the light condensing lens 41, optical axes $d_{lf4}$ of three light fluxes lf4 intersect on a position Px on a virtual face vlf that is apart from the light condensing lens 41 by a focus distance $f_{40}$ of the light condensing lens 41 along an optical axis $d_{40}$ of the light condensing lens 41. In the illustrated example, the light diffusion device 50 is located on the virtual face vlf that is apart from the light condensing lens 41 by the focus distance $f_{40}$ of the light condensing lens 41 along the optical axis $d_{40}$ of the light condensing lens 41. Thus, the three light fluxes lf3 having been shaped by the shaping optical system 20 are overlapped at least partially on the light diffusion device 50, by the light condensing action of the light condensing optical system 40.

In particular, in the illustrated example, as shown in FIG. 3, the scanner 30 and the light condensing optical system 40 are located such that the polygonal mirror 31 reflects a laser light from the shaping optical system 20 on a position apart from the light condensing lens 41 by the focus distance $f_{40}$ of the light condensing lens 41 along the optical axis $d_{40}$ of the light condensing lens 41 or on a position close to the position. Further, as described above, each of light fluxes lf3, which has been reflected by the polygonal mirror 31 and has entered the light condensing optical system 40, is a divergent light flux lf3 whose divergent point is located on the reflection surface of the polygonal mirror 31 or close thereto. Thus, each light flux lf3 passes through the light condensing lens 41 so as to be converted to parallel fluxes lf4. As a result, the light fluxes lf4 having been shaped by the shaping optical system 20 irradiate the same area on the light diffusion device 50 by the light condensing function of the light condensing optical system 40, i.e., the light fluxes lf4 are overlapped on the light diffusion device 50 highly precisely. Since the scanner 30 changes traveling directions of laser lights with time, a spot area S on which the light fluxes lf4 are condensed by the light condensing optical system 40 changes its position over time on the light diffusion device 50.

A plurality of the light condensing optical systems 40 may be provided correspondingly to the respective light source units 17a, 17b and 17c included in the laser light source 15. Alternatively, the single light condensing optical system 40 capable of adjusting light paths of laser lights from the light source units 17a, 17b and 17c may be provided. For example, when a laser light is diverged or converged only in a plane parallel to the sheet plane of FIG. 3, the light condensing lens 41 forming the light condensing optical system 40 may be a cylindrical lens extending to have a certain cross-sectional shape in the depth direction of the sheet plane of FIG. 2. According to this example, the light condensing lens 41 can be shared by laser lights emitted by the light source units 17a, 17b and 17c.

Next, the light diffusion device 50 is described. The light diffusion device 50 diffuses a laser light so as to illuminate a predetermined range. To be more specific, the laser light diffused by the light diffusion device 50 passes through an illumination area Z, and then illuminates a predetermined range that is an actual illumination range.

The illumination area Z and an element illumination area Zp, which forms a part of the illumination area Z, are illumination areas of near fields that are overlappingly illuminated by respective element diffusion devices 55 in the light diffusion device 50. An illumination range of a far field is generally expressed as a diffusion angle distribution in an angular space, rather than an actual illumination area size. The terms "illumination area" and "element illumination area" in this specification include a diffusion angle range in an angular space in addition to an actual illumination area (illumination range). Thus, a predetermined range illuminated by the illumination device 10 of FIGS. 1 and 4 can be an area that is greatly larger than the illumination area Z of a near field shown in FIGS. 1 and 4.

Figure 4:
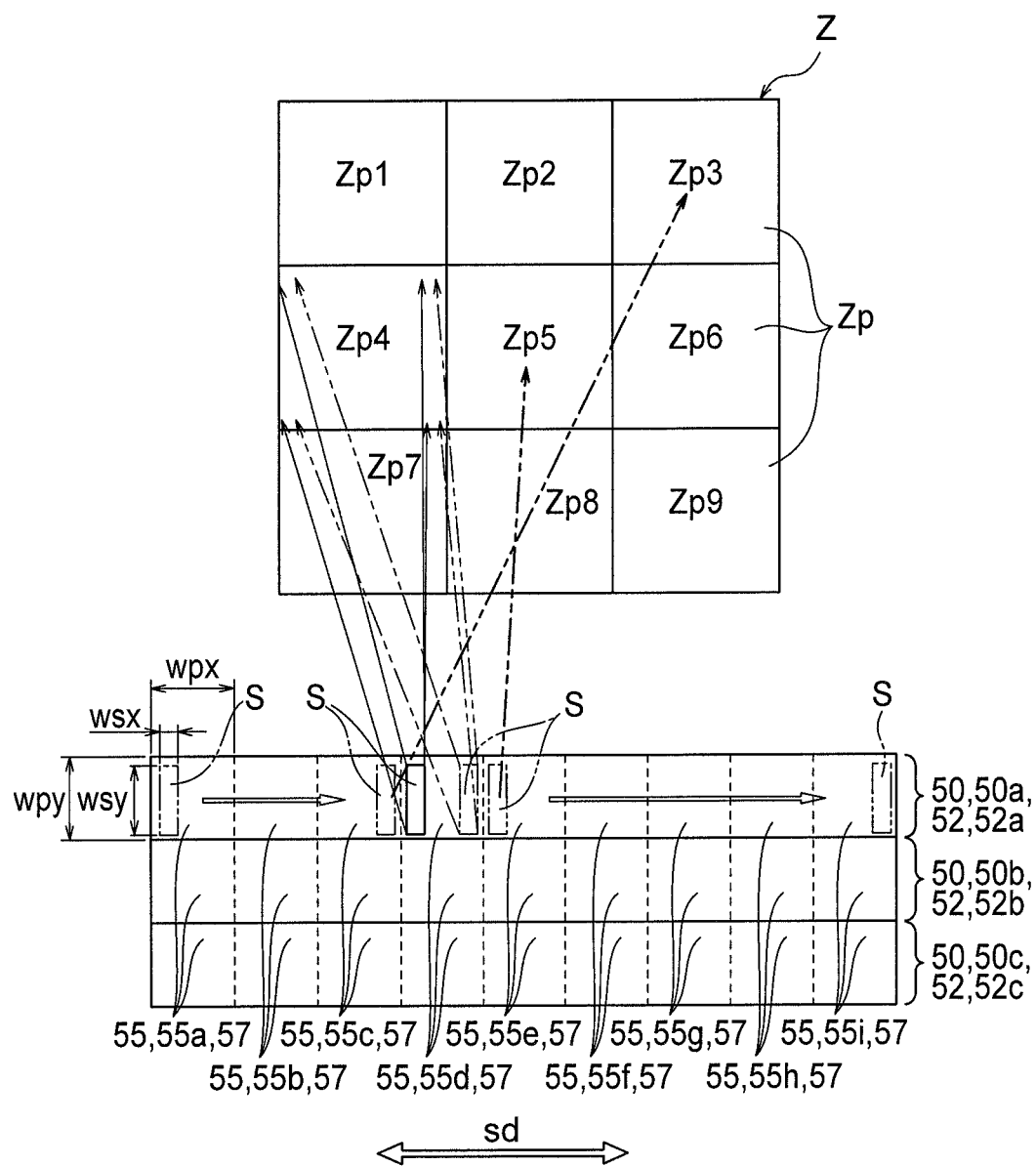
FIG. 4 is a view showing the light diffusion device and an illumination area that is illuminated with diffusion light from the light diffusion device in the illumination device of FIG. 1, for explaining a function of the light diffusion device.

FIG. 4 is a plan view showing the light diffusion device 50, together with the illumination area Z to which light is directed by the light diffusion device 50. In the illustrated example, the light diffusion device 50 includes a first light diffusion device 50a, a second light diffusion device 50 and a third light diffusion device 50c, correspondingly to the fact that the laser light source 15 includes the first to third light source units 17a, 17b and 17c. A laser light from the first light source unit 17a enters the first light diffusion device 50a, a laser light from the second light source unit 17b enters the second light diffusion device 50b, and a laser light from the third light source unit 17c enters the third light diffusion device 50c. By using the laser lights that have entered the whole areas of the respective light diffusion devices 50a, 50b and 50c so as to be diffused, the whole area of the common illumination area Z can be illuminated. Thus, the first light diffusion device 50a directs red light from the first light source unit 17a toward the illumination area Z, the second light diffusion device 50b directs green light from the second light source unit 17b toward the illumination area Z, and the third light diffusion device 50c directs blue light from the third light source unit 17c toward the illumination area Z, whereby the illumination area Z can be illuminated in white. As shown in FIG. 1, the light diffusion devices 50a, 50b and 50c are respectively formed to have an elongate shape in a direction orthogonal to the rotational axis line ra of the polygonal mirror 31 forming the scanner 30. The light diffusion devices 50a, 50b and 50c are arranged side by side in a direction orthogonal to their longitudinal directions.

As shown by the dotted lines in FIG. 4, each of the light diffusion devices 50a, 50b and 50c has a plurality of element diffusion devices 55. Each element diffusion device 55 has a light path control function for directing light, which has been incident on each area in its incident surface, toward a predetermined direction depending on a position of the area. The element diffusion device 55 described herein corrects a traveling direction of light incident on a given area or a given position, and directs the light to a predetermined area. Namely, laser lights emitted to respective areas, which are obtained by planarly dividing the incident surface of the element diffusion device 55, pass through the element diffusion device 55, and then illuminate areas that are at least partially overlapped with each other.

In the illustrated example, light, which has entered a small area in the element diffusion device 55 via the scanner 30, is diffused by the element diffusion device 55 to illuminate the whole area of a predetermined element illumination area Zp. The element illumination area Zp forms a part of the illumination area Z. An element illumination area Zp corresponding to one element diffusion device 55 is not at least partially overlapped with an element illumination area Zp corresponding to another element diffusion device 55. Namely, an aggregation of the element illumination areas Zp corresponding to a plurality of element diffusion devices 55 provides the illumination area Z that can be illuminated by the illumination device 10.

In the example shown in FIG. 4, nine element diffusion devices 55 are aligned along the longitudinal directions of the respective light diffusion devices 50a, 50b and 50c. The illumination area Z is planarly divided like a grid into nine element illumination areas Zp. That is to say, in the illustrated example, one element illumination area Zp is not overlapped with another element illumination area Zp. First element diffusion devices 55a of the respective light diffusion devices 50a, 50b and 50c illuminate a first element illumination area Zp1. Similarly, second to ninth element diffusion devices 55b to 55i of the respective light diffusion devices 50a, 50b and 50c illuminate second to ninth element illumination areas Zp2 to Zp9.

Since a traveling direction of a laser light is changed by the scanner 30 over time, as shown in FIG. 4, the laser lights (laser beams) scan the light diffusion devices 50a, 50b and 50c along the longitudinal directions of the light diffusion devices 50a, 50b and 50c. As shown in FIG. 4, an area on the light diffusion device 50 irradiated with the laser light at a certain instance, i.e., a spot area S has a planar dimension smaller than the element diffusion device 55. The spot area S scans the first to ninth element diffusion devices 55a to 55i sequentially.

The light diffusion device 50 is formed with the use of a hologram storage medium 52, for example. In the example shown in FIGS. 1 and 4, three hologram storage media 52a, 52b and 52c are disposed correspondingly to the respective light diffusion devices 50a, 50b and 50c. The respective hologram storage media 52a, 52b and 52c are provided correspondingly to laser lights of different wavelength ranges. By using laser lights of different wavelength ranges which have entered the whole area of the respective hologram storage media 52a, 52b and 52c so as to be diffused, the whole area of the common illumination area Z can be illuminated.

Each of the hologram storage media 52a, 52b and 52c is segmented into a plurality of the element diffusion devices 55. The respective element diffusion devices 55 are formed of element holograms 57 storing interference fringe patters different from one another. A laser light incident on each element hologram 57 is diffracted by an interference fringe pattern, and illuminates a corresponding element illumination area Zp in the illumination area Z. By variously adjusting the interference fringe patterns, a traveling direction of a laser light that is diffracted by each element hologram 57, in other words, a traveling direction of a laser light that is diffused by each element hologram 57 can be controlled.

The element hologram 57 can be manufactured by using scattered light from a real scattering plate as object light, for example. To be more specific, when a hologram photosensitive material that is a matrix of the element hologram 57 is irradiated with reference light and object light of coherent light interfering with each other, interference fringes by the light interference are formed on the hologram photosensitive material so that the element hologram 57 is manufactured. Laser light that is coherent light is used as reference light, while scattered light of an isotropic scattering plate, which is available inexpensively, is used as object light, for example.

By emitting laser light toward the element diffusion device 55 such that the laser light travels reversely to the light path of the reference light that was used when the element hologram 57 was manufactured, a reconstructed image of the scattering plate is generated on a position where the scattering plate is located, from which the object light used when the element hologram 57 was manufactured was generated. When the scattering plate from which the object light used when the element hologram 57 was manufactured was generated uniformly scattered light by its surface, the reconstructed image of the scattering plate obtained by the hologram 57 is a uniform surface illumination. Thus, an area in which the reconstructed image of the scattering plate is generated becomes an element illumination area Zp.

Instead of being formed by using real object light and reference light, a complicated interference fringe pattern formed on each element hologram 57 can be designed by using a computer based on a wavelength and an incident direction of expected illumination light to be reconstructed as well as a shape and a position of an image to be reconstructed. An element hologram 57 thus obtained is also referred to as computer generated hologram (CGH). In addition, a Fourier conversion hologram in which respective points on each element hologram 57 have the same diffusion angle properties may be generated by a computer. Further, a size and a position of an actual illumination range may be set by disposing an optical member such as a lens behind an optical axis of an element illumination area Zp.

One of the advantages of providing the element hologram 57 as the element diffusion device 55 is that a light energy density of laser light can be decreased by diffusion. Another advantage is that the element hologram 57 can be used as a directional surface light source. In this case, as compared with a conventional lamp light source (point light source), a luminance on a light source surface for achieving the same illumination distribution can be decreased. Thus, safety of laser light can be improved. Namely, even when a person looks a laser light having passed through the element illumination area Zp with his/her eyes, the eyes are less affected as compared with a case in which a person looks a single point light source with his/her eyes.

Specifically, the element diffusion device 55 may be a volume type hologram storage medium using a photopolymer, a volume type hologram storage medium that stores hologram using a photosensitive medium containing a silver salt material, or a relief type (embossing type) hologram storage medium.

Next, an operation of the illumination device 10 as structured above is described.

As shown in FIG. 1, based on a control signal from the emission control unit 12, the respective light source units 17a, 17b and 17c oscillate laser lights (laser beams) of respective wavelength ranges. Laser lights going out from the laser light source 15 firstly travel toward the shaping optical system 20. In the example shown in FIG. 2, the laser lights of the respective wavelength ranges are shaped into parallel light fluxes lf1 by the beam expander 21 and the collimation lens 22 of the shaping optical system 20. Thereafter, each of the parallel light fluxes lf1 of the respective wavelength ranges is divided into convergent light fluxes lf2 by the element lens 24 of the lens array 23. As to the laser lights of the respective wavelength ranges, the convergent light fluxes lf2 are similarly shaped, and optical axes $d_{lf2}$ of the convergent light fluxes lf2 are parallel to one another.

The laser lights having been shaped by the shaping optical system 20, i.e., the convergent light fluxes lf2 travel toward the polygonal mirror 31 forming the scanner 30. The polygonal mirror 31 is consecutively rotated about the rotational axis line ra. Thus, an inclination angle of the reflection surface of the polygonal mirror 31 is cyclically changed within a predetermined angular area. As a result, a direction of a laser light reflected by the polygonal mirror 31 cyclically changes.

As shown in FIG. 2, the polygonal mirror 31 reflects the convergent light fluxes lf2 on a position where the convergent light fluxes lf2 converge, or on a position close thereto. Thus, since the convergent light fluxes lf2 are reflected by the polygonal mirror 31, the convergent light fluxes lf2 are converted into divergent light fluxes lf3 whose divergent points are located on the reflection position of the polygonal mirror 31, or on a position close thereto. Each of the six reflection surfaces of the polygonal mirror 31 is large enough to reflect all the convergent light fluxes lf2 having been shaped by the shaping optical system 20. Thus, as shown in FIG. 3, optical axes $d_{lf3}$ of the divergent light fluxes lf3 that are the laser lights reflected by the polygonal mirror 31 remain parallel. Since the polygonal mirror 31 reflects the light fluxes lf3 that are in the convergent state, enlargement of the polygonal mirror 31 can be effectively avoided.

In addition, the polygonal mirror 31 includes the first reflection unit 31a, the second reflection unit 31b and the third reflection unit 31c, along this rotational axis line ra. Since these reflection units 31a, 31b and 31c are synchronically operated, the laser light from the first light source unit 17a, the laser light from the second light source unit 17b and the laser light from the third light source unit 17c synchronically change their traveling directions.

As shown in FIG. 3, the divergent light fluxes lf3 with their light paths having been adjusted by the scanner 30 enter the light condensing optical system 40. The optical axes $d_{lf3}$ of the divergent light fluxes lf3 remain parallel to one another. In addition, the light diffusion device 50 is located on the focus Pf of the light condensing lens 41 forming the light condensing optical system 40. Thus, light fluxes lf4 with their light paths having been adjusted by the light condensing lens 41 are condensed by the light condensing lens 41, and their optical axes $d_{lf4}$ intersect on the light diffusion device 50. In particular, in the illustrated example, the reflection position of the polygonal mirror 31 is located on a focus position behind the light condensing lens 41, or on a position close thereto. Thus, the light fluxes lf3 traveling from the polygonal mirror 31 toward the light condensing lens 41 are converted to parallel light fluxes lf4 by the lens effect of the light condensing lens 41. The parallel light fluxes lf4 are overlapped with one another on the light diffusion device 50.

An area on which the parallel light fluxes lf4 are overlapped with one another on the light diffusion device 50, i.e., the spot area S scans the light diffusion device 50 along the longitudinal direction of the elongate light diffusion device 50, in conjunction with the operation of the scanner 30. As a result, as shown in FIG. 4, the laser lights sequentially irradiate the element diffusion devices 55. The laser light incident on each element diffusion device 55 is diffused by the element diffusion device 55 so as to illuminate the whole area of an element illumination area Zp corresponding to the element diffusion device 55.

The emission control unit 12 controls emission of laser lights from the light source unit 17, depending on irradiation positions of laser lights on the light diffusion device 50. Thus, only a desired element illumination area Zp in the illumination area Z can be selected and illuminated. In addition, the emission control unit 12 can control emission of light from the light source units 17a, 17b and 17c independently. Thus, it is also possible to illuminate a predetermined element illumination area Zp with light emitted from one(s) selected from the first light source unit 17a, the second light source unit 17b and the third light source unit 17c. That is to say, each of the first to ninth element illumination areas Zp1 to Zp9 included in the illumination area Z can be adjusted independently from the other element illumination areas, as to whether illuminated or not, the degree of brightness and the color of illumination light.

As disclosed in WO2012/033174A, the use of coherent light gives rise to generation of speckles. The speckles may be recognized as a spot pattern to cause physiological discomfort.

In the illustrated illumination device 10, as shown in FIG. 4, an area on the light diffusion device 50 irradiated with a laser light at a certain instance, i.e., a spot area S, which is irradiated with overlapped parallel light fluxes lf4, is smaller than the element light diffusion device 55. The spot area S moves in the element diffusion device 55 in conjunction with the operation of the scanner 30. The element diffusion device 55 is formed of the element hologram 57 as the hologram storage medium 52, for example, and diffuses light of a predetermined wavelength range, which has entered a given part thereof from a predetermined direction or a direction close thereto, so as to illuminate the whole area of an element illumination area Zp corresponding to the element diffusion device 55. Thus, while a spot area S moves in one element diffusion device 55, an incident direction of illumination light incident on each position of the element illumination area Zp changes over time. The fast change of incident direction cannot be dissolved by human eyes, whereby multiplexed coherent light scattered patterns that are not correlated to one another are observed by the human eyes. Therefore, speckles generated correspondingly to the respective scattered patterns are overlapped and averaged, which is observed by an observer. For this reason, the speckles can be made unnoticeable in each element illumination area Zp.

In order to simplify control of the scanner 30, the scanner 30 is preferably operated such that a laser light can cyclically scan the whole area of the light diffusion device 50. In the example shown in FIG. 4, the scanner 30 is preferably operated such that a laser light scans over the whole lengths of the light diffusion devices 50a, 50b and 50c along the longitudinal directions of the light diffusion devices 50a, 50b and 50c. When only a predetermined element illumination area Zp is desired to be illuminated, the emission control unit 12 controls emission or stop of laser light of the laser light source 15, depending on the operation of the scanner 30, in other words, depending on a position on the light diffusion device 50 to be irradiated with a laser light.

Figure 6:
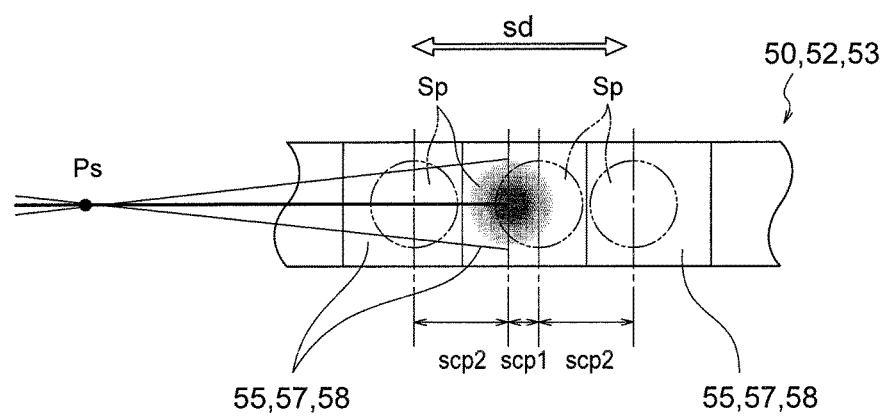
FIG. 6 is a plan view showing the spot area on the light diffusion device, with a shaping optical system and the light condensing optical system being omitted.

On the other hand, coherent light emitted from a coherent light source such as a laser light source generally involves illuminance non-uniformity in a spot area. Generally, as shown in FIG. 6, the center of the spot area Sp is brightest, and it gradually darkens toward a periphery of the spot area Sp. Typically, an illuminance distribution is the Gaussian distribution from the center of the spot area Sp toward the periphery thereof. Namely, the spot area Sp has a large rim part of a low illuminance. Thus, as shown in FIG. 6, an effective scanning section scp1, in which the whole spot area Sp is located inside one element diffusion device 55 corresponding to a predetermined element illumination area Zp, is relatively short. On the other hand, as shown in FIG. 6, an ineffective scanning section scp2, in which only a part of the spot area Sp is located within the one element diffusion device 55, i.e., in the example shown in FIG. 6, the ineffective scanning section scp2, in which the spot area Sp is located over two element diffusion devices 55 that are adjacent in a scanning direction sd, is relatively long. In the example shown in FIG. 6, the effective scanning section scp1 is significantly shorter than the ineffective scanning section scp2.

In the example shown in FIG. 6, when only a predetermined element illumination area Zp is illuminated, the emission control unit 12 emits a laser light in such a manner that the center of the spot area Sp is located within the effective scanning section scp1, while stops emission of laser light in such a manner that the center of the spot area Sp is located within the ineffective scanning section scp2. Thus, when the scanner 30 is operated at a constant speed, in the example shown in FIG. 6, a time period in which the emission of laser light is stopped is significantly long. Namely, the laser light source 15 is not efficiently used. Further, in order to illuminate an element illumination area Zp sufficiently brightly by emitting light in a short period of time, it is necessary to prepare a high output laser light source.

In order to deal with this problem, the illumination device 10 in the first embodiment is equipped with the shaping optical system 20 and the scanner 30. The shaping optical system 20 shapes coherent light emitted from the laser light source 15. The light condensing optical system 40 is located on a light path of coherent light from the shaping optical system 20 up to the light diffusion device 50, and condenses the coherent light such that the spot area S on the light diffusion device 50 is smaller than the element diffusion device 55. Due to the shaping optical system 20 and the scanner 30, it is possible not only to regulate the shape and the size of the spot area S on the light diffusion device 50, but also to make uniform an illuminance distribution of the spot area S.

Figure 5:
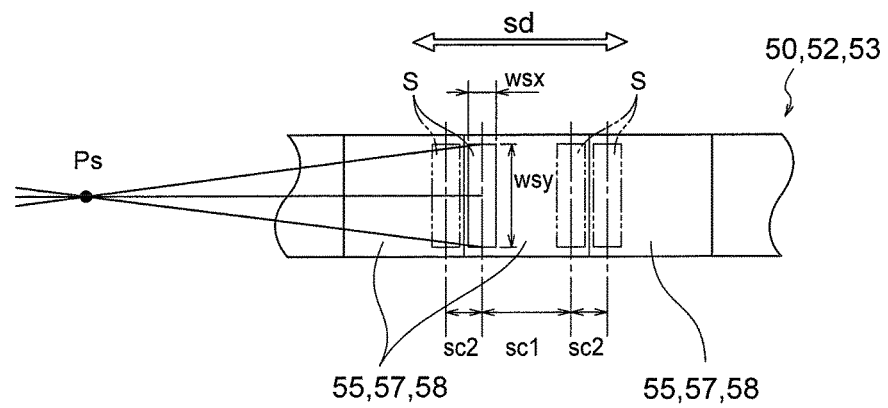
FIG. 5 is a plan view showing a spot area on the light diffusion device.

Thus, as shown in FIG. 5, the effective scanning section sc1, in which the whole spot area S is located only within one element diffusion device 55 corresponding to a predetermined element illumination area Zp, can be made relatively long. On the other hand, as shown in FIG. 5, the ineffective scanning section scp2, in which only a part of the spot area S is located within the one element diffusion device 55, i.e., in the illustrated example, the ineffective scanning section scp2, in which the spot area Sp is located over two element diffusion devices 55 that are adjacent in the scanning direction sd, can be made relatively short. In the example shown in FIG. 5, the effective scanning section sc1 is significantly longer than the ineffective scanning section sc2. Thus, even when only a predetermined element illumination area Zp is illuminated, a period of time in which a laser light is emitted can be increased. Thus, it is possible to illuminate the element diffusion device 55 sufficiently brightly by means of the efficient use of the laser light source 15, instead of using a high output laser light source 15. Thus, the performance of the laser light source 15 is sufficiently utilized so as to illuminate the illumination area Z in a desired light distribution pattern with a sufficiently bright quantity of light.

Particularly in the example shown in FIGS. 4 and 5, a size wsx of the spot area S along a direction parallel to the scanning direction sd of the spot area S is significantly smaller than a size wsy of the spot area S along a direction orthogonal to the scanning direction sd of the spot area S, in particular, smaller than a half of the size wsy. In the direction parallel to the scanning direction sd of the spot area S, the size wsx of the spot area S is significantly smaller than a size wpx of the element diffusion device 55, in particular, smaller than a half of the size wpx. Thus, the ineffective scanning section sc2, in which only a part of the spot area S is located within the one element diffusion device 55, can be made very short. Therefore, according to the example shown in FIGS. 4 and 5, a period of time in which the laser light source 15 stops emission of laser light can be significantly made short. That is to say, the laser light source 15 can be more efficiently utilized.

In addition, as shown in FIG. 5, in the direction orthogonal to the scanning direction sd of the spot area S, the size wsy of the spot area S is substantially the same as or slightly smaller than the size wpy of the element diffusion device 55. Thus, most of the light diffusion device 50 can be irradiated with coherent light, in conjunction with the operation of the scanner 30. Namely, the whole surface of the light diffusion device 50 can be efficiently utilized, so as to avoid enlargement of the illumination device 10.

Further, adjustment of the shape of the spot area S and the illuminance distribution in the spot area S by using the shaping optical system 20 and the light condensing optical system 40 is advantageous in terms of making speckles unnoticeable.

As shown in FIG. 5, by making smaller the size wsx of the spot area S along the direction parallel to the scanning direction sd of the spot area S, a period of time in which respective positions of the element diffusion device 55 is irradiated with coherent light can be made relatively short. That is to say, a position from which illumination light toward each position of the element illumination area Zp goes out switches for a short period of time. In other words, an incident direction of the illumination light toward each position of the element illumination area Zp change rapidly. As a result, since speckle patterns are overlapped over time, speckles can be effectively made unnoticeable.

In addition, as shown in FIG. 5, by making uniform the illuminance distribution in the spot area S, speckles can be effectively made unnoticeable at each instance. As shown in FIG. 6, when the uniformity of illumination distribution in the spot area Sp is low, a phase intensity from each position in the spot area Sp toward one position Ps in the element illumination area Zp at a given instance becomes nonuniform. Thus, since the overlap of speckle patterns at each instance is insufficient, the speckle reduction effect cannot be efficiently exerted in a sufficient manner. On the other hand, as shown in FIG. 5, when the illumination distribution in the spot area Sp is uniform, a phase intensity from each position in the spot area S toward one position Ps in the element illumination area Zp at a given instance can be made uniform. Thus, since the overlap of speckle patterns at each instance is effectively realized, the speckle reduction effect can be efficiently exerted in a sufficient manner.

Particularly in the example shown in FIG. 5, the large size wsy of the spot area S in the direction orthogonal to the scanning direction sd of the spot area S is ensured. Thus, while the size wsx of the spot area S in the direction parallel to the scanning direction sd of the spot area S is small, broadness of the spot area S can be effectively ensured. As a result, the overlap of speckle patterns can be more effectively realized at each instance.

As described above, in the first embodiment, the illumination device 10 includes the shaping optical system 20 that shapes coherent light, and the light condensing optical system 40 located on a light path of the coherent light from the shaping optical system 20 up to the light diffusion device 50. The light condensing optical system 40 condenses coherent light such that the spot area S on the light diffusion device 50 is smaller than the element diffusion device 55. Each element diffusion device 55 diffuses coherent light incident thereon so as to illuminate an element illumination area Zp corresponding to the element diffusion device 55. According to the first embodiment, the shape of the spot area S and the illuminance distribution of the spot area S can be adjusted by the shaping optical system 20 and the light condensing optical system 40. As a result, the performance of the laser light source 15 is sufficiently utilized so as to illuminate the illumination area Z in a desired light distribution pattern with a sufficiently bright quantity of light.

In addition, in the first embodiment, the shaping optical system 20 divides coherent light emitted from the coherent light source 15 into light fluxes lf2. The light condensing optical system 40 adjusts light paths of light fluxes lf3 such that the light fluxes lf3 are at least partially overlapped on the light diffusion device 50. Thus, even when an illuminance distribution of the coherent light upon emission from the coherent light source 15 is non-uniform, since the illuminance distribution is divided and overlapped, the illuminance distribution can be effectively made uniform. In particular, when the illuminance distribution of the coherent light upon emission from the coherent light source 15 is the typical Gaussian distribution, the illuminance distribution is planarly divided and overlapped, so that the illuminance distribution can be significantly effectively made uniform. Thus, the illumination area Z can be more brightly illuminated with a desired light distribution pattern.

Further, in the first embodiment, the light condensing optical system 40 is the lens 41 having the focus position Pf on which the light diffusion device 50 is located. According to such a light condensing optical system 40, although it has a simple structure, light incident on the light condensing optical system 40 at a given instance can be condensed highly efficiently on the spot area S on the light condensing optical system 40, so that the illuminance distribution of the spot area S can be effectively made uniform.

Further, in the first embodiment, the shaping optical system 20 includes the collimation lens 22, and the lens array 23 located on a light path from the collimation lens 22 up to the light condensing optical system 40. According to such a shaping optical system 20, the optical axes $d_{lf3}$ of the light fluxes lf3 incident on the light condensing optical system 40 can be made parallel. In this case, by means of the light condensing optical system 40 using the light condensing lens 41, the optical axes $d_{lf4}$ of the light fluxes, which have been shaped by the shaping optical system 20, can be allowed to intersect on the light diffusion device 50. Thus, the illuminance distribution of the spot area S can be more effectively made uniform.

Further, in the first embodiment, the lens array 23 includes the element lenses 24. The light fluxes lf2 emergent from the element lenses 24 can be the same light distributions each other. In this case, by means of the light condensing optical system 40 using the light condensing lens 41, the light fluxes which have been shaped by the shaping optical system 20 can be highly precisely overlapped with one another on the light diffusion device 50. Thus, the shape of the spot area S can be more precisely adjusted, and the illuminance distribution of the spot area S can be more effectively made uniform.

The aforementioned first embodiment can be variously modified. Modification examples are described herebelow. In the drawings used in the below description, a component that can be similarly structured as that of the above embodiment has the same reference number as the number used for the corresponding component of the above embodiment, and redundant description is omitted.

In the aforementioned first embodiment, there is shown the example in which the shaping optical system 20 includes the beam expander 21, the collimation lens 22 and the lens array 23. However, the present invention is not limited to this example. The shaping optical system 20 may be made of a beam homogenizer 25 that forms a uniform intensity distribution. As the beam homogenizer 25, a member using diffractive optical elements (DOE) or a member using an aspherical lens or a free-form surface lens can be employed.

In addition, in the aforementioned first embodiment, there is shown the example in which the light diffusion device 50 is made of the hologram storage medium 52. However, the present invention is not limited to this example. For example, the light diffusion device 50 may be made by using a lens array group in which the respective element diffusion devices 55 constitute one lens array. In this case, the lens array is provided for each element distribution device 55, and the shape of each lens array is designed such that each lens array illuminates an element illumination area Zp in the illumination area Z. Positions of the respective element illumination areas Zp are at least partially different.

Further, in the aforementioned first embodiment, there is shown the example in which the polygonal mirror 31 reflects a laser light on a position apart from the element lens 24 by the focus distance of the element lens 24 along the optical axis $d_{24}$ of the element lens 24. However, the present invention is not limited to this example. In addition, in the aforementioned first embodiment, there is shown the example in which the polygonal mirror 31 reflects a laser light on a position apart from the light condensing lens 41 by the focus distance of the light condensing lens 41 along the optical axes $d_{40}$ of the light condensing lens 41. However, the present invention is not limited to this example. For example, the light condensing lens 41 may be located on a light path from the element lens 24 toward the scanner 30. In addition, the lens array 23 including the element lenses 24 may be located on a light path from the scanner 30 toward the light condensing optical system 40.

Further, in the aforementioned first embodiment, there is shown the example in which the laser light source 15 as a coherent light source emits laser lights of different wavelength ranges. However, the present invention is not limited to this example. The coherent light source may be made as a light source that emits coherent light of the same wavelength range.

Further, the above-described illumination device 10 may be mounted on a conveyance, or installed at a predetermined location. When it is mounted on a conveyance, the conveyance may be various moving bodies such as a vehicle like an automobile, a flying body like an aircraft, a train, a ship, a diving body and so on.

Although some modification examples of the first embodiment have been described above, the modification examples can be naturally combined and used.

Next, a second embodiment is described with reference to an example shown in FIGS. 7 to 13.

Figure 7:
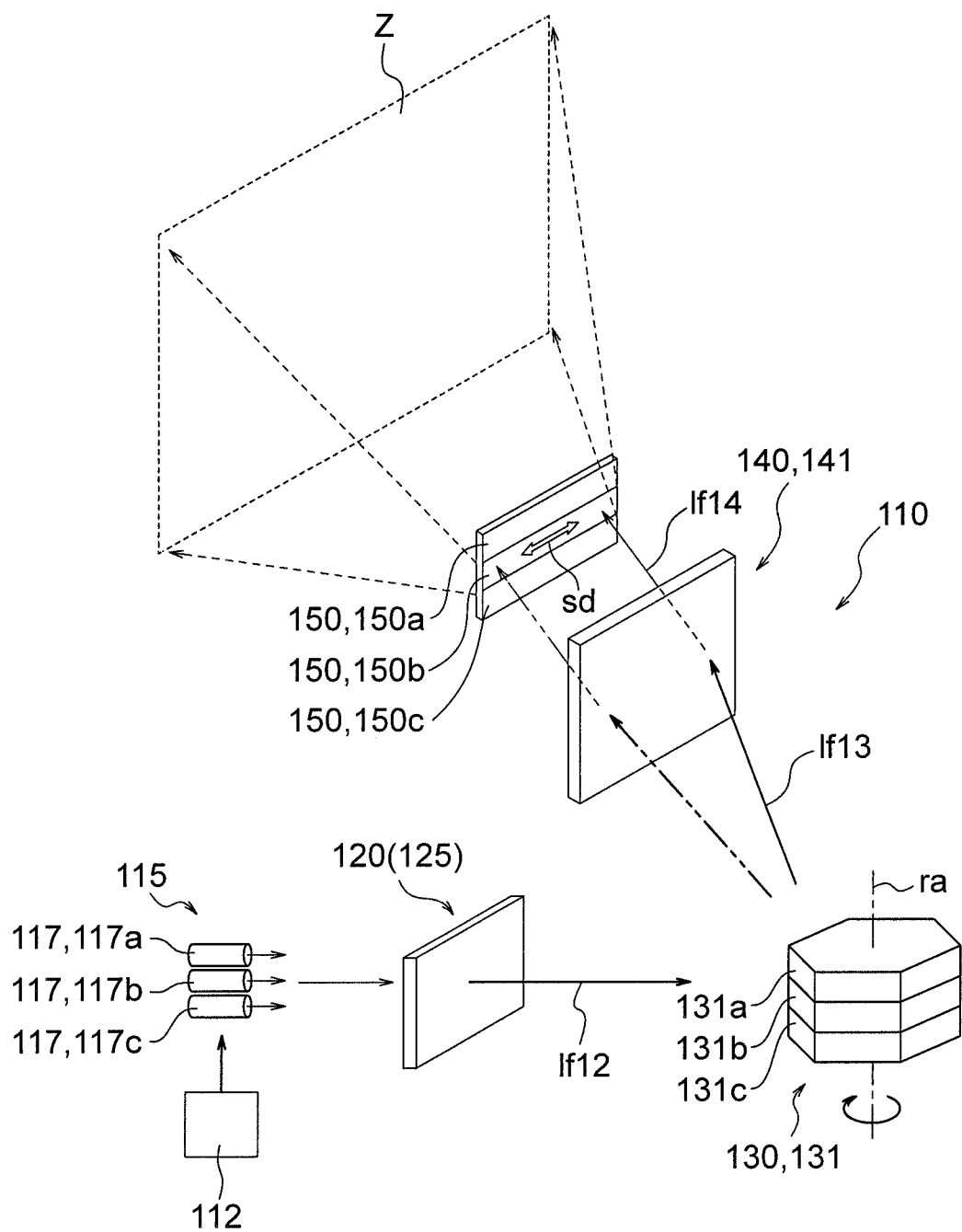
FIG. 7 is a perspective view schematically showing an overall structure of an illumination device, for explaining a second embodiment of the present invention.

FIG. 7 is a perspective view schematically showing an overall structure of an illumination device 110. The illumination device 110 illuminates an illumination area Z using coherent light such as laser light (laser beam). The illumination device 110 includes, as a light source, a laser light source 115 that oscillates laser light. The laser light source 115 oscillates laser light that is coherent light. The illumination device 110 includes a diffusion optical system 120, a scanner 130, a light condensing optical system 140 and a light deflection device 150, which process light emitted from the laser light source 115. In the example shown in FIG. 7, the diffusion optical system 120, the scanner 130, the light condensing optical system 140 and the light deflection device 150 are located in this order along a light path of laser light from the laser light source 115, and they process laser light in this order. As described in detail below, the illumination device 110 described herein can illuminate, with a large quantity of light, the illumination area Z in a desired light distribution pattern, while sufficiently utilizing the performance of the light source 115 by means of optical actions in the diffusion optical system 120 and the light condensing optical system 140. Herebelow the respective constituent elements are sequentially described.

In the example shown in FIG. 7, the laser light unit 115 includes a plurality of light source units 117 that emit laser light. The light source units 117 may be independently arranged, or may be a light source module formed by arranging the light source units 117 side by side on a common substrate. For example, the light source units 117 have a first light source unit 117a that oscillates light of a red emission wavelength range, a second light source unit 117b that oscillates light of a green emission wavelength range, and a third light source unit 117c that oscillates light of a blue emission wavelength range. According to this example, since three laser lights (laser beams) emitted from the light source units 117a, 117b and 117c are overlapped, illumination beams of various colors including a white illumination beam can be generated.

Although an example in which the laser light source 115 has the three light source units 117a, 117b and 117c having emission wavelength ranges different from one another is described herebelow, the present invention is not limited thereto. The laser light source 115 may have two light units 117 having emission wavelength ranges different from each other, or four or more light units 117 having emission wavelength ranges different from one another. In addition, in order to increase emission intensity, a plurality of the light source units 117 may be provided for each emission wavelength range.

As shown in FIG. 7, the illumination device 110 includes an emission control unit 112 connected to the laser light source 115. The emission control unit 112 controls emission timings of laser lights (laser beams) emitted by the laser light source 115. In particular, the emission control unit 112 can switch emission of laser lights and stop of emission of laser lights from the light source unit 117a, 117b or 117c, independently from other light source units. The control of emitting or not emitting laser lights by the emission control unit 112 is carried out based on scanning timings of a plurality of laser lights by the scanner 130, in other words, based on incident positions of laser lights on the light deflection device 150. As described above, in the case where the laser light source 115 can emit three laser lights, i.e., a red laser light, a blue laser light and a green laser light, it is possible to generate illumination light of a color that is a combination of given two or more colors of red, blue and green, by controlling an emission timing of each laser light.

The emission control unit 112 may control whether a laser light is emitted from each light source unit 117 or not, i.e., ON/OFF of emission, or may switch blocking or not blocking of a light path of a laser light having been emitted from each light source unit 117. In the latter case, light shutter units, not shown, may be disposed between the respective light source units 117 and the diffusion optical system 120, such that passage and blockage of laser lights can be switched by the light shutter units.

Next, the diffusion optical system 120 is described. The diffusion optical system 120 diffuses laser light emitted from the laser light source 115. In particular, the diffusion optical system 120 diffuses light from the light source (light-source light) such that a cross-sectional area of the light immediately before it enters the light condensing optical system 140 is larger than a cross-sectional area of the light immediately before it enters the diffusion optical system 120. The cross-sectional area of light is an area occupied by a light path in a cross-section orthogonal to an optical axis of the light. In addition, an optical axis is an axis line in which an intensity of the light is highest. Thus, the diffusion optical system 120 shapes, for example, incident light into a divergent light flux or a convergent light flux.

Figure 8:
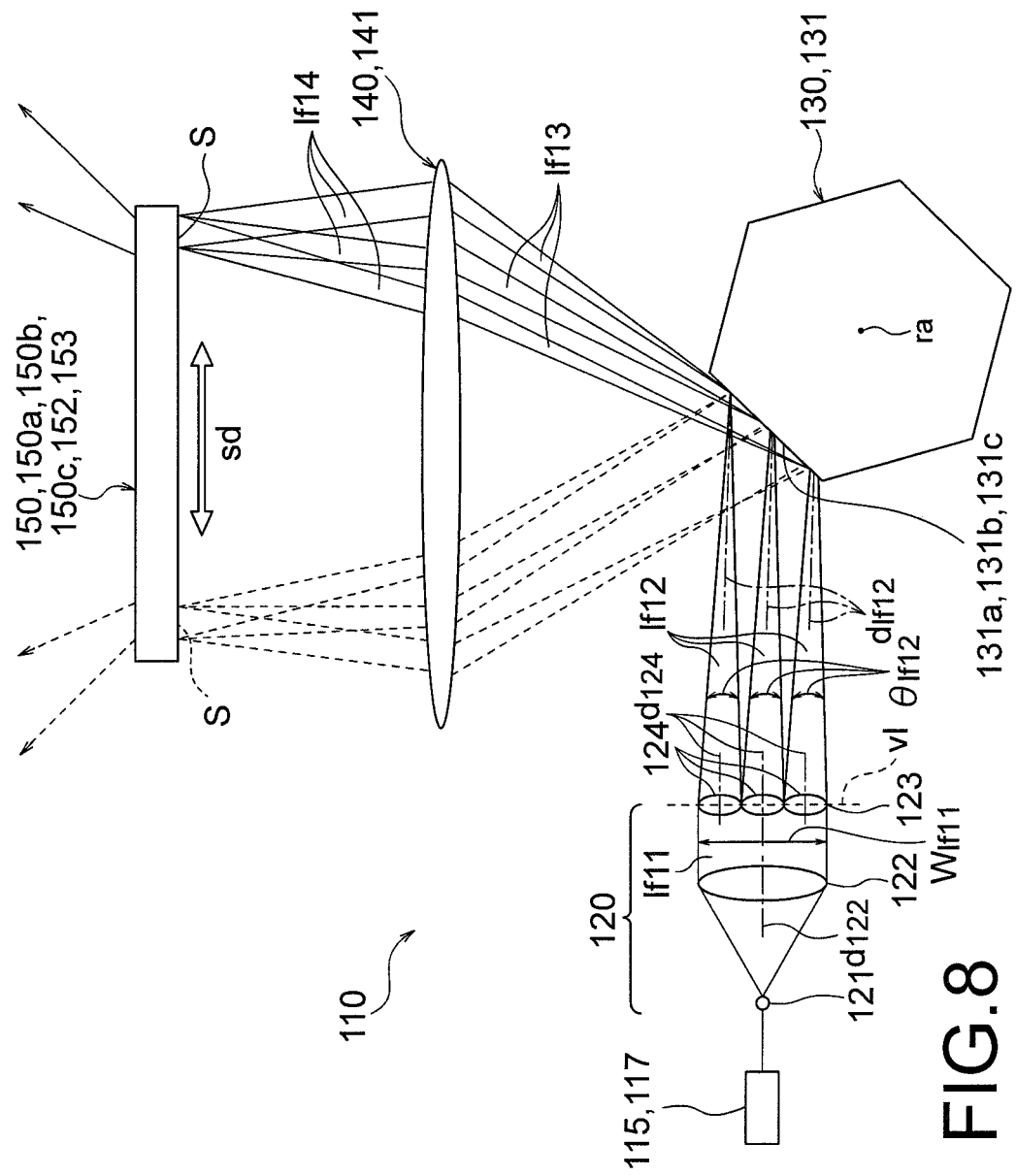
FIG. 8 is a plan view showing the illumination device of FIG. 7.

FIG. 8 is a plan view showing the illumination device 110. As shown in FIG. 8, the diffusion optical system 120 includes a beam expander 121, a collimation lens 122 and a lens array 123, in this order along a light path of laser light. The beam expander 121 shapes a laser light emitted from the laser light source 115 into a divergent light flux. The collimation lens 122 reshapes the divergent light flux generated by the beam expander 121 into parallel light fluxes lf11. The lens array 123 includes a plurality of element lenses 124 that are arranged on positions facing the collimation lens 122. The element lenses 124 are positioned such that an optical axis $d_{124}$ of each element lens 124 is parallel to an optical axis $d_{122}$ of the collimation lens 122. In addition, the element lenses 124 are arranged on a virtual face vl that is orthogonal to the optical axis $d_{122}$ of the collimation lens 122. Each element lens 124 shapes a parallel light flux lf11, which has been shaped by the collimation lens 122 and has entered the element lens 124, into a convergent light flux lf12.

In the example shown in FIG. 8, the diffusion optical system 120 divides a laser light emitted from the laser light source 115 into a plurality of light fluxes lf12. The diffusion optical system 120 divides a laser light into light fluxes lf12 the number of which is equal to the number of the element lenses 124 included in the lens array 123. In the illustrated example, each element lens 124 shapes a parallel light flux lf11, which has been shaped by the collimation lens 122 and has entered the element lens 124, into a convergent light flux lf12. That is to say, respective light fluxes lf12 divided by the diffusion optical system 120 are convergent light fluxes. In addition, in the illustrated example, the element lenses 124 have the same structures each other. Thus, light fluxes f112 emitted from the element lenses 124 are the same light distributions. For example, the light fluxes lf12 have the same convergent angles and the same convergent positions, and optical axes $d_{lf12}$ of the light fluxes lf12 are parallel to one another.

A plurality of the diffusion optical systems 120 may be provided correspondingly to the respective light source units 117 included in the laser light source 115. Alternatively, the single diffusion shaping optical system 120 capable of adjusting light paths of laser lights from the light source units 117a, 117b and 117c may be provided. In the example shown in FIG. 8, the light source units 117a, 117b and 117c may be aligned in the depth direction of the sheet plane of FIG. 8, the beam expander 121 may diverge a laser light only in a plane of the sheet plane of FIG. 8, and the collimation lens 122 and the element lenses 124 of the lens array 123 in the diffusion optical system 120 may respectively be formed as cylindrical lenses extending to have a certain cross-sectional shape in the depth direction of the sheet plane of FIG. 8. According to this example, the light source units 117 can share the collimation lens 122 and the lens array 123.

Figure 9:
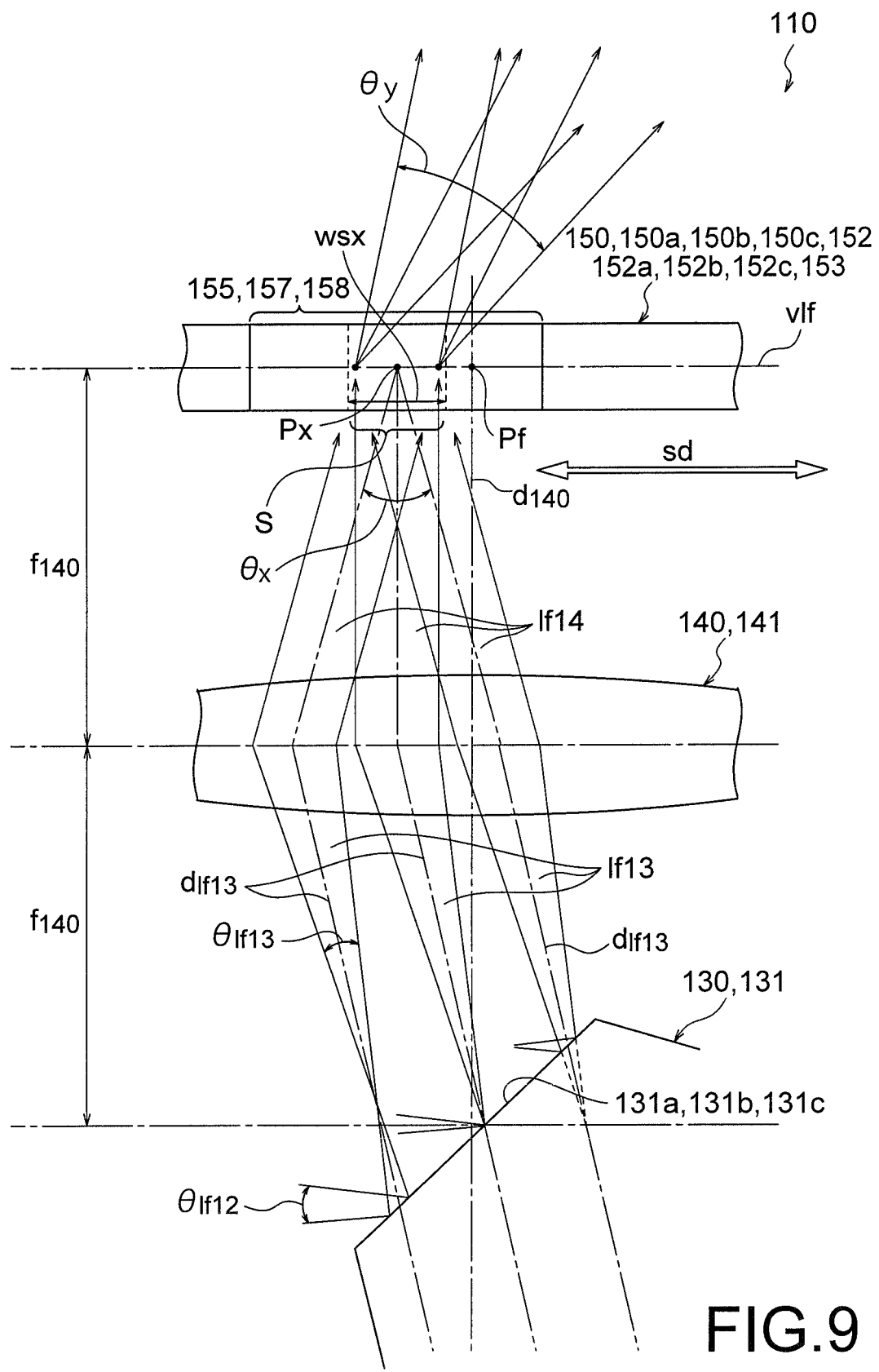
FIG. 9 is a plan view showing a scanner, a light condensing optical system and a light deflection device of the illumination device of FIG. 7, mainly for explaining a function of the light condensing optical system.

Next, the scanner 130 is described. The scanner 130 adjusts a traveling direction of a laser light emitted from the laser light source 115. The scanner 130 changes traveling directions of laser lights with time. Due to the light path adjustment of the scanner 130, a laser light emitted from the laser light source 115 scans the light deflection device 150. In the example shown in FIGS. 7 and 8, the scanner 130 is formed as a polygonal mirror 131 having six reflection surfaces. When the polygonal mirror 131 is rotated about its central axis line as a rotational axis line ra, a reflection direction of light that has entered there from a certain direction can be changed cyclically. The respective six reflection surfaces of the polygonal mirror 131 are formed as flat surfaces. Thus, as shown in FIG. 9, after three light fluxes lf13, which had been shaped by the diffusion optical system 120, have been reflected by the polygonal mirror 131 so that their traveling directions have been changed, optical axes $d_{lf13}$ of the light fluxes lf13 remain parallel. FIG. 9 is a partially enlarged plan view showing a light path succeeding to the scanner 130.

In particular, in the illustrated example, the light source units 117a, 117b and 117c are aligned in a direction parallel to the rotational axis line ra of the polygonal mirror 131 (see FIG. 7). The reflection surface of the polygonal mirror 131 includes, along this rotational axis line ra, a first reflection unit 131a, a second reflection unit 131b and a third reflection unit 131c. The first reflection unit 131a reflects a laser light emitted from the first light source unit 117a and cyclically changes a traveling direction of the laser light in a plane orthogonal to the rotational axis line ra. In addition, the second reflection unit 131b reflects a laser light emitted from the second light source unit 117b, and the third reflection unit 131c reflects a laser light emitted from the third light source unit 117c.

As shown in FIG. 8, the polygonal mirror 131 is positioned with respect to the diffusion optical system 120, such that the polygonal mirror 131 reflects light from the diffusion optical system 120 on a focus position of each element lens 124 of the lens array 123, or on a position close thereto. Thus, as shown in FIG. 9, light reflected from the polygonal mirror 131 substantially becomes a divergent light flux lf13 whose divergent point is the reflection surface of the polygonal mirror 131.

The scanner 130 is not limited to the illustrated polygonal mirror 131. It is possible to use, as the scanner 130, an apparatus that three-dimensionally changes in a biaxial direction a traveling direction of light incident thereon from a certain direction. For example, MEMS (micro electromechanical systems) such as a digital micromirror device (DMD) may be used as the scanner 130.

Next, the light condensing optical system 140 is described. The light condensing optical system 140 is located on a light path of a laser light from the diffusion optical system 120 up to the light deflection device 150. The light condensing optical system 140 optically processes a laser light diffused by the diffusion optical system 120. The light condensing optical system 140 condenses an expanded laser light such that a spot area S on the light deflection device 150, i.e., an area, which is irradiated with a laser light on the light deflection device 150 at a given instance, has a smaller planar dimension.

In the illustrated example, the light condensing optical system 140 is formed by a light condensing lens 141 having a focus Pf. The light condensing lens 141 is located on a light path of a laser light from the scanner 130 toward the light deflection device 150. As described above, the diffusion optical system 120 divides a laser light into light fluxes lf13. As shown in FIG. 9, the optical axes $d_{lf13}$ of the light fluxes lf13 are parallel to one another. Thus, as shown in FIG. 9, because of a lens action of the light condensing lens 141, optical axes $d_{lf14}$ of three light fluxes lf14 intersect on a position Px on a virtual face vlf that is apart from the light condensing lens 141 by a focus distance $f_{140}$ of the light condensing lens 141 along an optical axis $d_{140}$ of the light condensing lens 141. In the illustrated example, the light deflection device 150 is located on the virtual face vlf that is apart from the light condensing lens 141 by the focus distance $f_{140}$ of the light condensing lens 141 along the optical axis $d_{140}$ of the light condensing lens 141. Thus, the three light fluxes lf13 having been shaped by the diffusion optical system 120 are overlapped at least partially on the light deflection device 150, by the light condensing action of the light condensing optical system 140.

A convergent angle $\theta_x$ of the optical axis $d_{lf14}$ of the convergent light flux lf14 in FIG. 9 depends on a light path width of the overall light-source light before it enters the light condensing lens 141. The light path width of the light-source light can be adjusted by a width $w_{in1}$ (see FIG. 8) of the parallel light flux lf11 formed by the beam expander 121 and the collimation lens 122 of the diffusion optical system 120. Thus, by suitably designing the beam expander 121 and the collimation lens 122, the convergent angle $\theta_x$ of the optical axis $d_{in4}$ of the convergent light fluxes lf14 can be adjusted when the light fluxes lf14 enter a spot area S.

In particular, in the illustrated example, as shown in FIG. 9, the scanner 130 and the light condensing optical system 140 are located such that the polygonal mirror 131 reflects a laser light from the diffusion optical system 120 on a position apart from the light condensing lens 141 by the focus distance $f_{140}$ of the light condensing lens 141 along the optical axis $d_{140}$ of the light condensing lens 141, or on a position close to the position. Further, as described above, each of light fluxes lf13, which has been reflected by the polygonal mirror 131 and has entered the light condensing optical system 140, is a divergent light flux lf13 whose divergent point is located on the reflection surface of the polygonal mirror 131, or close thereto. Thus, each light flux lf13 incident on the light condensing lens 141 passes through the light condensing lens 141 so as to be converted to a parallel flux lf14. As a result, the light fluxes lf14 having been shaped by the diffusion optical system 120 irradiate the same area on the light deflection device 150 by the light condensing function of the light condensing optical system 140, i.e., the light fluxes lf14 are overlapped on the light deflection device 150 highly precisely. Since the scanner 130 changes traveling directions of laser lights over time, a spot area S on which the light fluxes lf14 are condensed by the light condensing optical system 140 changes its position over time on the light deflection device 150.

A width wsx of the spot area S in FIG. 9 depends on a distance between the light condensing optical system 140 and the scanner 130, and a divergent angle $\theta_{in3}$ of a divergent light flux lf13 that enters the light condensing optical system 140. In addition, the divergent angle $\theta_{in3}$ of the divergent light flux lf13 depends on a convergent angle $\theta_{in2}$ of the convergent light flux lf12 having been shaped by the element lens 124 of the diffusion optical system 120. Thus, by suitably positioning the light condensing optical system 140 and the scanner 130 and by suitably designing the element lens 124, the width wsx of the spot area S can be adjusted. In particular, by suitably designing the element lens 124, the width wsx of the spot area S can be adjusted while effectively avoiding enlargement of the illumination device 110.

A plurality of the light condensing optical systems 140 may be provided correspondingly to the respective light source units 117a, 117b and 117c included in the laser light source 115. Alternatively, the single light condensing optical system 140 capable of adjusting light paths of laser lights from the light source units 117a, 117b and 117c may be provided. For example, when a laser light is diverged or converged only in a plane parallel to the sheet plane of FIG. 9, the light condensing lens 141 forming the light condensing optical system 140 may be a cylindrical lens extending to have a certain cross-sectional shape in the depth direction of the sheet plane of FIG. 8. According to this example, the light condensing lens 141 can be shared by laser lights emitted by the light source units 117a, 117b and 117c.

Next, the light deflection device 150 is described. The light deflection device 150 adjusts a light path of light from the light source unit 115 to direct the incident light to a predetermined range so as to illuminate the predetermined range. To be more specific, a laser light whose light path is adjusted by the light deflection device 150 passes through an illumination area Z, and then illuminates a predetermined range that is an actual illumination range.

The illumination area Z and an element illumination area Zp (see FIG. 11), which forms a part of the illumination area Z, are illumination areas of near fields that are overlappingly illuminated by respective element deflection devices 155 in the light deflection device 150. An illumination range of a far field is generally expressed as a diffusion angle distribution in an angular space, rather than an actual illumination area size. The terms "illumination area" and "element illumination area" in this specification include a diffusion angle range in an angular space in addition to an actual illumination area (illumination range). Thus, a predetermined range illuminated by the illumination device 110 of FIGS. 7 and 10 can be an area that is greatly larger than the illumination area Z of a near field shown in FIGS. 7 and 10.

Figure 10:
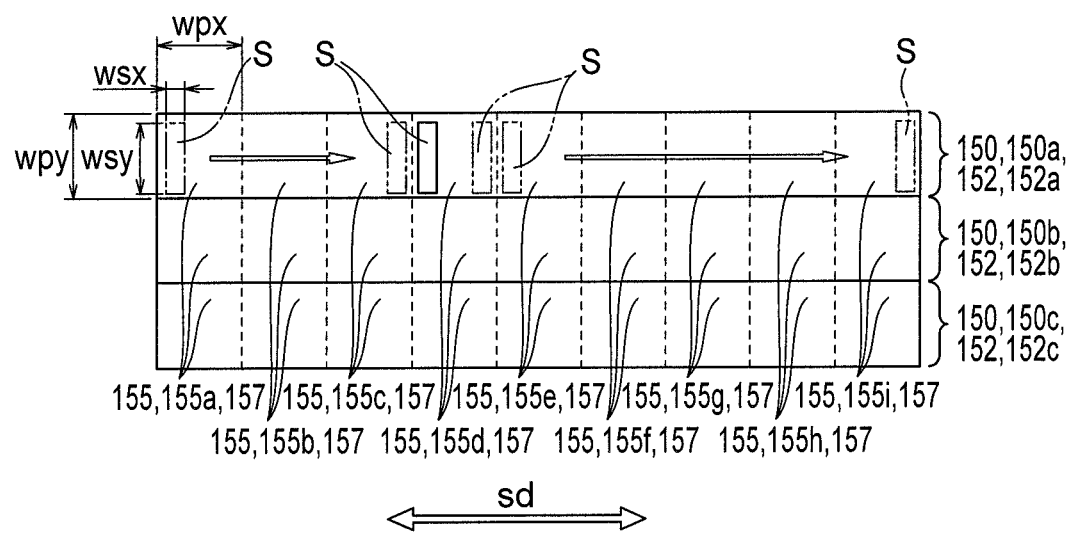
FIG. 10 is a plan view showing the light deflection device of the illumination device of FIG. 7.

FIG. 10 is a plan view showing the light deflection device 150. In the illustrated example, the light deflection device 150 includes the first light deflection device 150a, a second light deflection device 150b and a third light deflection device 150c, correspondingly to the fact that the laser light source 115 includes the first to third light source units 117a, 117b and 117c. A laser light from the first light source unit 117a enters the first light deflection device 150a, a laser light from the second light source unit 117b enters the second light deflection device 150b, and a laser light from the third light source unit 117c enters the third light deflection device 150c. By using the laser lights that have entered the whole areas of the respective light deflection devices 150a, 150b and 150c so that their light paths are adjusted, the whole area of the common illumination area Z can be illuminated.

Thus, the first light deflection device 150a directs red light from the first light source unit 117a toward the illumination area Z, the second deflection device 150b directs green light from the second light source unit 117b toward the illumination area Z and the third light deflection device 150c directs blue light from the third light source unit 117c toward the illumination area Z, whereby the illumination area Z can be illuminated in white. As shown in FIG. 7, the light deflection devices 150a, 150b and 150c are respectively formed to have an elongate shape in a direction orthogonal to the rotational axis line ra of the polygonal mirror 131 forming the scanner 130. The light deflection devices 150a, 150b and 150c are arranged side by side in a direction orthogonal to their longitudinal directions.

As shown by the dotted lines in FIG. 10, each of the light deflection devices 150a, 150b and 150c has a plurality of element deflection devices 155. Each element deflection device 155 has a light path control function for directing a traveling direction of light, which has been incident thereon from a certain direction, toward a predetermined direction. For example, when lights enter one element deflection device 155 from two different directions, the lights from the respective directions go out from the element deflection device 155 toward directions different from each other. In addition, each element deflection device 155 has a light path control function different from the other element deflection devices 155. Thus, lights, which respectively have entered two different element deflection devices 155 from the same direction, go out from the element deflection devices 155 toward directions different from each other.

In the illustrated example, when light has entered an element deflection device 155 via the diffusion optical system 120, the scanner 130 and the light condensing optical system 140, a traveling direction of the light is bent by the element deflection device 155, and the light travels to a predetermined element illumination area Zp. Particularly in the second embodiment, light is diffused by the diffusion optical system 120, then a light path of the light is adjusted by the scanner 130, and the light further is condensed by the light condensing optical system 140 so as to enter the element deflection device 155. Namely, as shown in FIG. 9, light incident on an element deflection device 155 at a certain instance has an incident direction distribution corresponding to the dispersion angle $\theta_x$ of the optical axes $d_{in4}$ of the convergent light fluxes lf14. Thus, light emergent from the element deflection device 155 at a certain instance also has an angular distribution corresponding to a predetermined dispersion angle $\theta_y$. In addition, as shown in FIG. 9, light incident on the element deflection device 155 at a certain instance enters the whole area of the spot area S having an areal broadness to a certain degree. Thus, the light incident on the element deflection device 155 is diffused by the element deflection device 155, and can illuminate the whole area of a predetermined element illumination area Zp.

An element illumination area Zp forms a part of the illumination area Z. An element illumination area Zp corresponding to one element deflection device 155 is not at least partially overlapped with an element illumination area Zp corresponding to another element deflection device 155. Namely, an aggregation of the element illumination areas Zp corresponding to a plurality of element deflection devices 155 provides the illumination area Z that can be illuminated by the illumination device 110.

Figure 11:
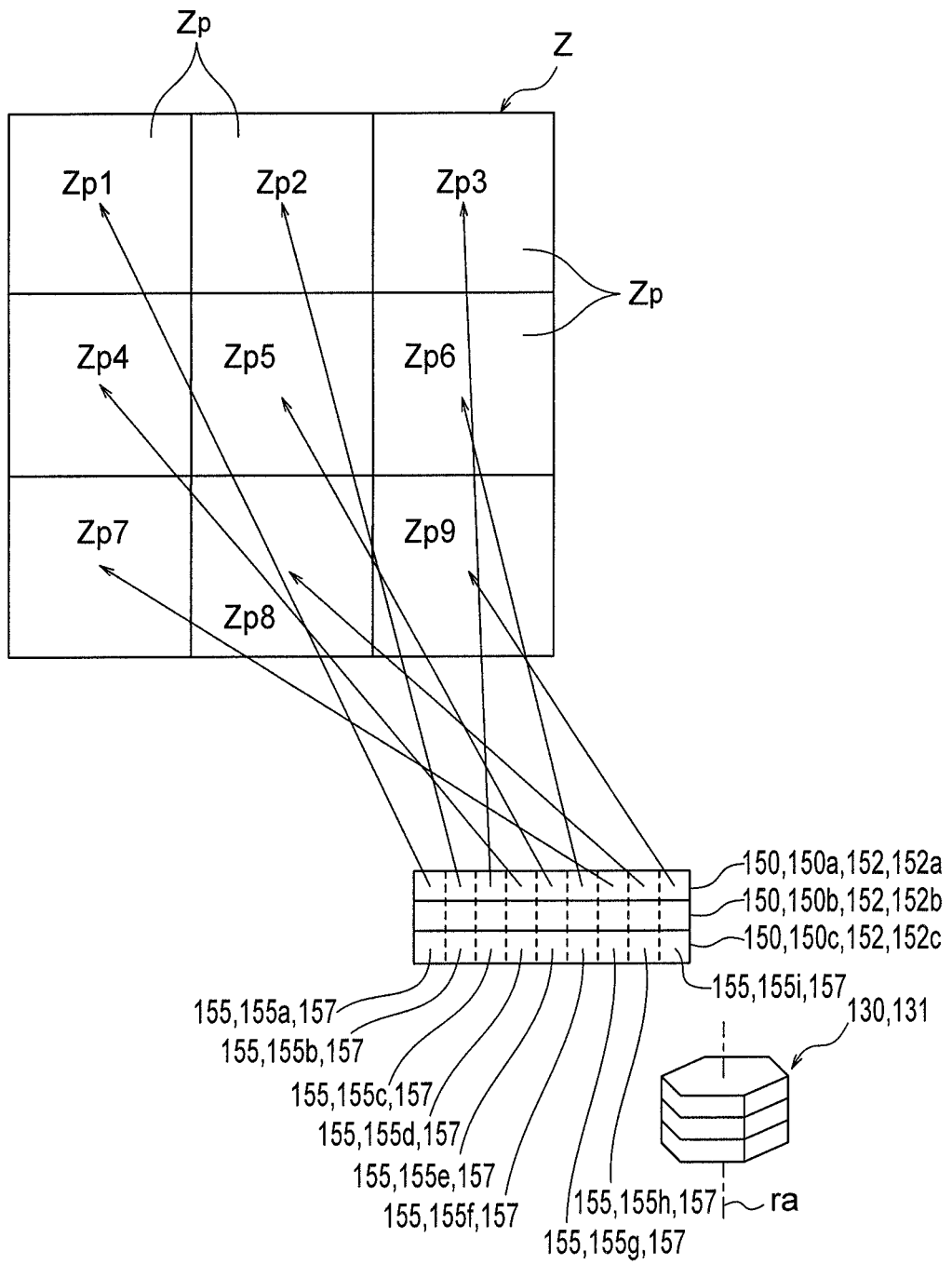
FIG. 11 is a view showing the light deflection device and an illumination area that is illuminated with light from the light deflection device in the illumination device of FIG. 7.

FIG. 11 is a plan view showing the element deflection devices 155, together with the element illumination areas Zp to which light is directed by the element deflection devices 155. In the example shown in FIG. 11, nine element deflection devices 155 are aligned along the longitudinal directions of the respective light deflection devices 150a, 150b and 150c. The illumination area Z is planarly divided like a grid into nine element illumination areas Zp. That is to say, in the illustrated example, one element illumination area Zp is not overlapped with another element illumination area Zp. First element deflection devices 155a of the respective light deflection devices 150a, 150b and 150c illuminate a first element illumination area Zp1. Similarly, second to ninth element deflection devices 155b to 155i of the respective light deflection devices 150a, 150b and 150c illuminate second to ninth element illumination areas Zp2 to Zp9.

Since a traveling direction of a laser light is changed by the scanner 130 over time, as shown in FIG. 10, the laser lights (laser beams) scan the light deflection devices 150a, 150b and 150c along the longitudinal directions of the light deflection devices 150a, 150b and 150c. As shown in FIG. 10, an area on the light deflection device 150 irradiated with the laser light at a certain instance, i.e., a spot area S has a planar dimension smaller than the element deflection device 155. The spot area S scans the first to ninth element deflection devices 155a to 155i sequentially.

The light deflection device 150 is formed with the use of a diffraction grating array 152, for example. In the example shown in FIGS. 7, 10 and 11, three diffraction grating arrays 152a, 152b and 152c are disposed correspondingly to the respective light deflection devices 150a, 150b and 150c. The respective diffraction grading arrays 152a, 152b and 152c are provided correspondingly to laser lights of different wavelength ranges. By using laser lights of wavelength ranges which have entered the whole area of the respective diffraction grating arrays 152a, 152b and 152c so as to be deflected, the whole area of the the common illumination area Z can be illuminated.

Each of the diffraction grating arrays 152a, 152b and 152c is segmented into a plurality of the element deflection devices 155. The respective element deflection devices 155 are formed of diffraction gratings 157 storing interference fringe patters different from one another. A laser light incident on each diffraction grating 157 is diffracted by an interference fringe pattern and illuminates a corresponding element illumination area Zp in the illumination area Z. By variously adjusting the interference fringe patterns, a traveling direction of a laser light that is diffracted by each diffraction grating 157, in other words, a traveling direction of a laser light that is deflected by each diffraction grating 157 can be controlled.

The diffraction grating 157 can be manufactured as a volume type hologram, for example. To be more specific, when a hologram photosensitive material that is a matrix of the diffraction grating 157 is irradiated with reference light and object light of coherent light interfering with each other, interference fringes by the light interference are formed on the hologram photosensitive material so that the diffraction grating 157 is manufactured.

By emitting laser light toward the element deflection device 155 such that the laser light travels reversely to the light path of the reference light that was used when the diffraction grating 157 was manufactured, diffraction light goes out from the diffraction grating 157 reversely along the light path of the object light that was used when the diffraction grating 157 was manufactured.

Instead of being formed by using real object light and reference light, a complicated interference fringe pattern formed on each diffraction grating 157 can be designed by using a computer based on a wavelength and an incident direction of expected illumination light to be reconstructed as well as a shape and a position of an image to be reconstructed. A diffraction grating 157 thus obtained is also referred to as computer generated hologram (CGH). In addition, a Fourier conversion hologram in which respective points on each diffraction grating 157 have the same diffusion angle properties may be generated by a computer. Further, a size and a position of an actual illumination range may be set by disposing an optical member such as a lens behind an optical axis of an element illumination area Zp.

One of the advantages of providing the diffraction grating 157 as the element deflection device 155 is that a light energy density of laser light can be decreased by diffusion. Another advantage is that the diffraction grating 157 can be used as a directional surface light source. In this case, as compared with a conventional lamp light source (point light source), a luminance on a light source surface for achieving the same illumination distribution can be decreased. Thus, safety of laser light can be improved. Namely, even when a person looks a laser light having passed through the element illumination area Zp with his/her eyes, the eyes are less affected as compared with a case in which a person looks a single point light source with his/her eyes.

Next, an operation of the illumination device 110 as structured above is described.

As shown in FIG. 7, based on a control signal from the emission control unit 112, the respective light source units 117a, 117b and 117c oscillate laser lights (laser beams) of respective wavelength ranges. Laser lights going out from the laser light source 115 firstly travel toward the diffusion optical system 120. In the example shown in FIG. 8, the laser lights of the respective wavelength ranges are shaped into parallel light fluxes lf11 by the beam expander 121 and the collimation lens 122 of the diffusion optical system 120. Thereafter, each of the parallel light fluxes lf11 of the respective wavelength ranges is divided into convergent light fluxes lf12 by the element lens 124 of the lens array 123. As to the laser lights of the respective wavelength ranges, the convergent light fluxes lf12 are similarly shaped, and optical axes of $d_{lfl2}$ of the convergent light fluxes lf12 are parallel to one another.

The laser lights having been shaped by the diffusion optical system 120, i.e., the convergent light fluxes lf12 travel toward the polygonal mirror 131 forming the scanner 130. The polygonal mirror 131 is consecutively rotated about the rotational axis line ra. Thus, an inclination angle of the reflection surface of the polygonal mirror 131 is cyclically changed within a predetermined angular area. As a result, a direction of a laser light reflected by the polygonal mirror 131 cyclically changes.

As shown in FIG. 8, the polygonal mirror 131 reflects the convergent light fluxes lf12 on a position where the convergent light fluxes lf12 converge, or on a position close thereto. Thus, since the convergent light fluxes lf12 are reflected by the polygonal mirror 131, the convergent light fluxes lf12 are converted into divergent light fluxes lf13 whose divergent points are located on the reflection position of the polygonal mirror 131, or on a position close thereto. Each of the six reflection surfaces of the polygonal mirror 131 is large enough to reflect all the convergent light fluxes lf12 having been shaped by the diffusion optical system 120. Thus, as shown in FIG. 9, optical axes $d_{lfl3}$ of the divergent light fluxes lf13 that are the laser lights reflected by the polygonal mirror 131 remain parallel. Since the polygonal mirror 131 reflects the light fluxes lf13 that are in the convergent state, enlargement of the polygonal mirror 131 can be effectively avoided.

In addition, the polygonal mirror 131 includes the first reflection unit 131a, the second reflection unit 131b and the third reflection unit 131c, along this rotational axis line ra. Since these reflection units 131a, 131b and 131c are synchronically operated, the laser light from the first light source unit 117a, the laser light from the second light source unit 117b and the laser light from the third light source unit 117c synchronically change their traveling directions.

As shown in FIG. 9, the divergent light fluxes lf13 with their light paths having been adjusted by the scanner 130 enter the light condensing optical system 140. The optical axes $d_{lfl3}$ of the divergent light fluxes lf13 remain parallel to one another. In addition, the light deflection device 150 is located on the focus Pf of the light condensing lens 141 forming the light condensing optical system 140. Thus, light fluxes lf14 with their light paths having been adjusted by the light condensing lens 141 are condensed by the light condensing lens 141, and their optical axes $d_{lfl4}$ intersect on the light deflection device 150. In particular, in the illustrated example, the reflection position of the polygonal mirror 131 is located on a focus position behind the light condensing lens 141, or on a position close thereto. Thus, the light fluxes lf13 traveling from the polygonal mirror 131 toward the light condensing lens 141 are converted to parallel light fluxes lf14 by the lens effect of the light condensing lens 141. The parallel light fluxes lf14 are overlapped with one another on the light deflection device 150.

An area on which the parallel light fluxes lf14 are overlapped with one another on the light deflection device 150, i.e., a spot area S scans the light deflection device 150 along the longitudinal direction of the elongate light deflection device 150, in conjunction with the operation of the scanner 130. As a result, as shown in FIG. 10, the laser lights sequentially irradiate the element deflection devices 155. The laser light incident on each element deflection device 155 is deflected by the element deflection device 155 so as to illuminate the whole area of an element illumination area Zp corresponding to the element deflection device 155.

The emission control unit 112 controls emission of laser lights from the light source unit 117, depending on irradiation positions of laser lights on the light deflection device 150. Thus, only a desired element illumination area Zp in the illumination area Z can be selected and illuminated. In addition, the emission control unit 112 can control emission of light from the light source units 117a, 117b and 117c independently. Thus, it is also possible to illuminate a predetermined element illumination area Zp with light emitted from one(s) selected from the first light source unit 117a, the second light source unit 117b and the third light source unit 117c. That is to say, each of the first to ninth element illumination areas Zp1 to Zp9 included in the illumination area Z can be adjusted independently from the other element illumination areas, as to whether illuminated or not, the degree of brightness and the color of illumination light.

In order to simplify control of the scanner 130, the scanner 130 is preferably operated such that a laser light can cyclically scan the whole area of the light deflection device 150. In the example shown in FIG. 10, the scanner 130 is preferably operated such that a laser light scans over the whole lengths of the light deflection devices 150a, 150b and 150c along the longitudinal directions of the light deflection devices 150a, 150b and 150c. When only a predetermined element illumination area Zp is desired to be illuminated, the emission control unit 112 controls emission and stop of laser light of the laser light source 115, depending on the operation of the scanner 130, in other words, depending on a position on the light deflection device 150 to be irradiated with a laser light.

Figure 13:
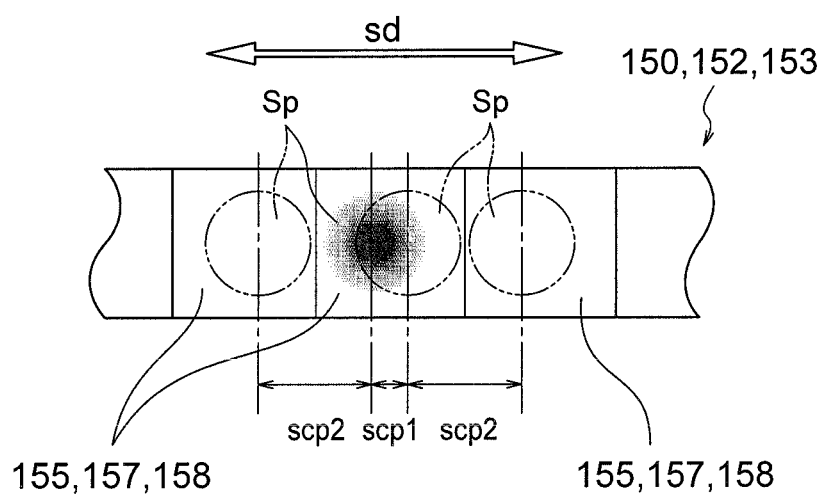
FIG. 13 is a plan view showing the spot area on the light deflection device, with a diffusion optical system and the light condensing optical system being omitted.

On the other hand, light emitted from a light source such as a laser light source generally involves illuminance non-uniformity in a spot area. Generally, as shown in FIG. 13, the center of the spot area Sp is brightest, and it gradually darkens toward a periphery of the spot area Sp. Typically, an illuminance distribution is the Gaussian distribution from the center of the spot area Sp toward the periphery thereof. Namely, the spot area Sp has a large rim part of a low illuminance. Thus, as shown in FIG. 13, an effective scanning section scp1, in which the whole spot area Sp is located inside one element deflection device 155 corresponding to a predetermined element illumination area Zp, is relatively short. On the other hand, as shown in FIG. 13, an ineffective scanning section scp2, in which only a part of the spot area Sp is located within the one element deflection device 155, i.e., in the example shown in FIG. 13, the ineffective scanning section scp2, in which the spot area Sp is located over two element deflection devices 155 that are adjacent in a scanning direction sd, is relatively long. In the example shown in FIG. 13, the effective scanning section scp1 is significantly shorter than the ineffective scanning section scp2.

In the example shown in FIG. 13, when only a predetermined element illumination area Zp is illuminated, the emission control unit 112 emits a laser light in such a manner that the center of the spot area Sp is located within the effective scanning section scp1, while stops emission of laser light in such a manner that the center of the spot area Sp is located within the ineffective scanning section scp2. Thus, when the scanner 130 is operated at a constant speed, in the example shown in FIG. 13, a time period in which the emission of laser light is stopped is significantly long. Namely, the laser light source 115 is not efficiently used. Further, in order to illuminate an element illumination area Zp sufficiently brightly by emitting light in a short period of time, it is necessary to prepare a high output laser light source.

In order to deal with this problem, the illumination device 110 in the second embodiment is equipped with the diffusion optical system 120 and the scanner 130. The diffusion optical system 120 shapes light-source light emitted from the laser light source 115. The light condensing optical system 140 is located on a light path of light from the diffusion optical system 120 up to the light deflection device 150, and condenses light-source light such that the spot area S on the light deflection device 150 is smaller than the element deflection device 155. Due to the diffusion optical system 120 and the scanner 130, it is possible not only to regulate the shape and the size of the spot area S on the light deflection device 150, but also to make uniform an illuminance distribution of the spot area S.

Figure 12:
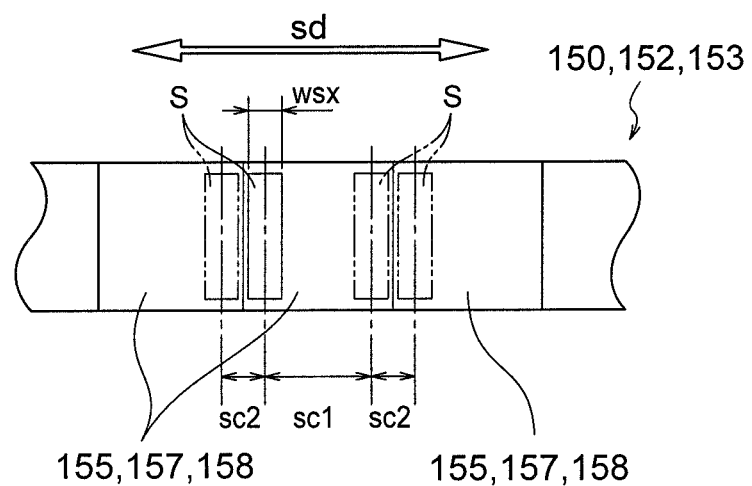
FIG. 12 is a plan view showing a spot area on the light deflection device.

Thus, as shown in FIG. 12, the effective scanning section sc1, in which the whole spot area S is located only within one element deflection device 155 corresponding to a predetermined element illumination area Zp, can be made relatively long. On the other hand, as shown in FIG. 12, the ineffective scanning section scp2, in which only a part of the spot area Sp is located within the one element deflection device 155, i.e., in the illustrated example, the ineffective scanning section scp2, in which the spot area Sp is located over two element deflection devices 155 that are adjacent in the scanning direction sd, can be made relatively short. In the example shown in FIG. 12, the effective scanning section sc1 is significantly longer than the ineffective scanning section sc2. Thus, even when only a predetermined element illumination area Zp is illuminated, a period of time in which a laser light is emitted can be increased. Thus, it is possible to illuminate the element defection device 155 sufficiently brightly by means of the efficient use of the laser light source 115, instead of using a high output laser light source 115. Thus, the performance of the laser light source 115 is sufficiently utilized so as to illuminate the illumination area Z in a desired light distribution pattern with a sufficiently bright quantity of light.

Particularly in the example shown in FIGS. 10 and 12, a size wsx of the spot area S along a direction parallel to the scanning direction sd of the spot area S is significantly smaller than a size wsy of the spot area S along a direction orthogonal to the scanning direction sd of the spot area S, in particular, smaller than a half of the size wsy. In the direction parallel to the scanning direction sd of the spot area S, the size wsx of the spot area S is significantly smaller than a size wpx of the element deflection device 155, in particular, smaller than a half of the size wpx. Thus, the ineffective scanning section sc2, in which only a part of the spot area S is located within the one element deflection device 155, can be made very short. Therefore, according to the example shown in FIGS. 10 and 12, a period of time in which the laser light source 115 stops emission of laser light can be significantly made short. That is to say, the laser light source 115 can be more efficiently utilized.

In addition, as shown in FIG. 12, in the direction orthogonal to the scanning direction sd of the spot area S, the size wsy of the spot area S is substantially the same as or slightly smaller than the size wpy of the element deflection device 155. Thus, most of the light deflection device 150 can be irradiated with light-source light, in conjunction with the operation of the scanner 130. Namely the whole surface of the light deflection device 150 can be efficiently utilized, so as to avoid enlargement of the illumination device 110.

As described above, in the second embodiment, the illumination device 110 includes the diffusion optical system 120 that diffuses light-source light emitted from the light source, and the light condensing optical system 140 located on a light path of light-source light from the diffusion optical system 120 up to the light deflection device 150. The light condensing optical system 140 condenses light-source light such that the spot area S on the light deflection device 150 is smaller than the element deflection device 155. Each element deflection device 155 adjusts a light path of light-source light incident thereon so as to illuminate an element illumination area Zp corresponding to the element deflection device 155. According to the second embodiment, the shape of the spot area S and the illuminance distribution of the spot area S can be adjusted by the diffusion optical system 120 and the light condensing optical system 140. As a result, the performance of the laser light source 115 is sufficiently utilized so as to illuminate the illumination area Z in a desired light distribution pattern with a sufficiently bright quantity of light.

In addition, in the second embodiment, the diffusion optical system 120 divides light-source light emitted from the light source 115 into light fluxes lf12. The light condensing optical system 140 adjusts light paths of light fluxes lf13 such that the light fluxes fl13 are at least partially overlapped on the light deflection device 150. Thus, even when an illuminance distribution of the light-source light upon emission from the light source 115 is non-uniform, since the illuminance distribution is divided and overlapped, the illuminance distribution can be effectively made uniform. In particular, when the illuminance distribution of the light-source light upon emission from the light source 115 is the typical Gaussian distribution, the illuminance distribution is planarly divided and overlapped, so that the illuminance distribution can be significantly effectively made uniform. Thus, the illumination area Z can be more brightly illuminated with a desired light distribution pattern.

Further, in the second embodiment, the light condensing optical system 140 is the lens 141 having the focus position Pf on which the light deflection device 150 is located. According to such a light condensing optical system 140, although it has a simple structure, light incident on the light condensing optical system 140 at a given instance can be condensed highly efficiently on the spot area S on the light condensing optical system 140, so that the illuminance distribution of the spot area S can be effectively made uniform.

Further, in the second embodiment, the diffusion optical system 120 includes the collimation lens 122, and the lens array 123 located on a light path from the collimation lens 122 up to the light condensing optical system 140. According to such a diffusion optical system 120, the optical axes $d_{if13}$ of the light fluxes lf13 incident on the light condensing optical system 140 can be made parallel. In this case, by means of the light condensing optical system 140 using the light condensing lens 141, the optical axes $d_{if14}$ of the light fluxes, which have been shaped by the diffusion optical system 120, can be allowed to intersect on the light deflection device 150. Thus, the illuminance distribution of the spot area S can be more effectively made uniform.

In addition, by adjusting the width $w_{if11}$ (see FIG. 8) of the parallel light flux lf11 by the beam expander 121 and the collimation lens 122, a dispersion angle θ (see FIG. 10) of the optical axes $d_{if14}$ of the convergent light fluxes lf14 incident on the light condensing lens 141 can be controlled. Thus, it is possible to shape illumination light going out from the element deflection device 155 to adjust a dispersion angle $\theta_y$ of the illumination light. Further, it is possible to adjust the size of a spot area S to be illuminated by the illumination light, and a brightness distribution in the spot area S.

Further, in the second embodiment, the lens array 123 includes the element lenses 124. The light fluxes lf12 emergent from the element lenses 124 can be the same light distributions each other. In this case, by means of the light condensing optical system 140 using the light condensing lens 141, the light fluxes which have been shaped by the diffusion optical system 120 can be highly precisely overlapped with one another on the light deflection device 150. Thus, the shape of the spot area S can be more precisely adjusted, and the illuminance distribution of the spot area S can be more effectively made uniform.

In addition, by suitably positioning the light condensing optical system 140 and the scanner 130 and by suitably designing the element lens 124 so as to adjust the convergent angle $\theta_{lf12}$ of the convergent light flux lf12 having been shaped by the element lens 124, the width wsx (see FIG. 10) of the spot area S can be controlled. In particular, by adjusting the convergent angle $\theta_{lf12}$ of the convergent light flux lf12 having been shaped by the element lens 124, the width wsx of the spot area S can be adjusted while effectively avoiding enlargement of the illumination device 110. Thus, it is possible to shape illumination light going out from the element deflection device 155. Further, it is possible to adjust the size of a spot area S to be illuminated by the illumination light, and a brightness distribution in the spot area S.

The aforementioned second embodiment can be variously modified. Modification examples are described herebelow. In the drawings used in the below description, a component that can be similarly structured as that of the above embodiment has the same reference number as the number used for the corresponding component of the above embodiment, and redundant description is omitted.

In the aforementioned second embodiment, there is shown the example in which the diffusion optical system 120 includes the beam expander 121, the collimation lens 122 and the lens array 123. However, the present invention is not limited to this example. The diffusion optical system 120 may be made of a beam homogenizer 125 that forms a uniform intensity distribution. As the beam homogenizer 125, a member using diffractive optical elements (DOE) or a member using an aspherical lens or a free-form surface lens can be employed.

In addition, in the aforementioned second embodiment, there is shown the example in which the light deflection device 150 is made of the diffraction grating array 152. However, the present invention is not limited to this example. For example, the light deflection device 150 may be made by using a prism array in which the respective element deflection devices 155 constitute one prism. In this case, a prism is provided for each element deflection device 155, and the shape of each prism is designed such that each prism illuminates an element illumination area Zp in the illumination area Z. Positions of the respective element illumination areas Zp are at least partially different.

Further, in the aforementioned second embodiment, there is shown the example in which the element deflection device 155 has a light path adjustment function for directing a traveling direction of light, which has been incident thereon from a certain direction, toward a predetermined direction. However, not limited thereto, the element deflection device 155 may have a diffusion property. For example, the element deflection device 155 may direct a traveling direction of light, which has been incident thereon from a certain direction, toward a range having an angular distribution about a predetermined direction. In this example, light emergent from the element deflection device 155 may have a maximum luminance in a predetermined direction, and a luminance of light emergent in a direction inclined to the predetermined direction may decrease as an inclination angle with respect to the predetermined direction increases.

Further, in the aforementioned second embodiment, there is shown the example in which the polygonal mirror 131 reflects a laser light on a position apart from the element lens 124 by the focus distance of the element lens 124 along the optical axis $d_{124}$ of the element lens 124. However, the present invention is not limited to this example. In addition, in the aforementioned first embodiment, there is shown the example in which the polygonal mirror 131 reflects a laser light at a position apart from the light condensing lens 141 by the focus distance of the light condensing lens 141 along the optical axes $d_{140}$ of the light condensing lens 141. However, the present invention is not limited to this example. For example, the light condensing lens 141 may be located on a light path from the element lens 124 toward the scanner 130. In addition, the lens array 123 including the element lenses 124 may be located on a light path from the scanner 130 toward the light condensing optical system 140.

Further, in the aforementioned second embodiment, there is shown the example in which the light condensing optical system 140 is formed of a convex lens. However, the present invention is not limited thereto. For example, the light condensing optical system 140 may be formed of a concave mirror.

Further, in the aforementioned second embodiment, there is shown the example in which the laser light source 115 as a light source emits laser light (laser beams) of a plurality of wavelength ranges. However, the present invention is not limited thereto. The light source may be a light source that emits light of the same wavelength range.

Further, the above-described illumination device 110 may be mounted on a conveyance, or installed at a predetermined location. When it is mounted on a conveyance, the conveyance may be various moving bodies such as a vehicle like an automobile, a flying body like an aircraft, a train, a ship, a diving body and so on.

Although some modification examples of the second embodiment have been described above, the modification examples can be naturally combined and used.

The invention claimed is:

1. An illumination device comprising:
   a light diffusion device including element diffusion devices that diffuse incident light;
   a coherent light source that emits coherent light;
   a shaping optical system that shapes the coherent light;
   a scanner that adjusts a traveling direction of the coherent light so as to allow the coherent light to scan the light diffusion device; and
   a light condensing optical system located on a light path of the coherent light from the shaping optical system up to the light diffusion device;
   wherein the light condensing optical system condenses the coherent light such that a spot area on the light diffusion device is smaller than the element diffusion device;
   wherein each element diffusion device diffuses the coherent light incident thereon so as to illuminate an element illumination area corresponding to the element diffusion device;

wherein the shaping optical system divides the coherent light emitted from the coherent light source into light fluxes;

wherein the light condensing optical system adjusts light paths of the light fluxes such that the light fluxes are overlapped at least partially on the light diffusion device;

wherein the element diffusion devices are arranged in a direction which is parallel to a scanning direction of the spot area; and wherein an effective scanning section along the scanning direction, in which the whole spot area is located only within one element diffusion device, is longer than an ineffective scanning section along the scanning direction, in which the spot area is located over two element diffusion devices that are adjacent in the scanning direction.

2. The illumination device according to claim 1, wherein the light condensing optical system includes a lens, and the light diffusion device is located on a focus position of the lens.

3. The illumination device according to claim 1, wherein the shaping optical system includes a collimation lens, and a lens array located on a light path from the collimation lens up to the light condensing optical system.

4. The illumination device according to claim 3, wherein the lens array includes element lenses; and wherein light fluxes emergent from the element lenses have the same light distributions.

5. The illumination device according to claim 4, further comprising an emission control unit that controls emission of the coherent light from the coherent light source, wherein the emission control unit controls emission of the coherent light of the coherent light source, depending on an irradiation position of the coherent light on the light diffusion device.

6. The illumination device according to claim 3, wherein the lens array includes element lenses; and wherein light fluxes emergent from the element lenses have the same light distributions.

7. The illumination device according to claim 1, wherein the light diffusion device has a hologram storage medium; and wherein the element diffusion devices are element holograms having interference fringe patterns different from one another.

8. The illumination device according to claim 1, wherein the light diffusion device has a lens array group including a plurality of lens arrays; and wherein the element diffusion devices have the lens arrays.

9. The illumination device according to claim 1, wherein the coherent light source is configured to emit the coherent light when the spot area is located within the effective scanning section and not to emit the coherent light when the spot area is located within the ineffective scanning section.

10. The illumination device according to claim 1, wherein the element diffusion devices are arranged along one direction; and wherein element illumination areas illuminated by the element diffusion devices are arranged in two directions different from each other.

11. The illumination device according to claim 1, wherein the spot area scans the diffusion device in one direction; and wherein element illumination areas illuminated by the element diffusion devices are arranged in two directions different from each other.

12. The illumination device according to claim 1, wherein the element diffusion devices are arranged along one direction; and wherein element illumination areas illuminated by the element diffusion devices are arranged in a direction which is nonparallel to the one direction.

13. The illumination device according to claim 1, wherein element illumination areas illuminated by the element diffusion devices are arranged in a direction which is nonparallel to a scanning direction of the spot area.

14. An illumination device comprising:

a light diffusion device including element diffusion devices that diffuse incident light;

a coherent light source that emits coherent light;

a shaping optical system that shapes the coherent light;

a scanner that adjusts a traveling direction of the coherent light so as to allow the coherent light to scan the light diffusion device; and a light condensing optical system located on a light path of the coherent light from the shaping optical system up to the light diffusion device;

wherein the light condensing optical system condenses the coherent light such that a spot area on the light diffusion device is smaller than the element diffusion device;

wherein each element diffusion device diffuses the coherent light incident thereon so as to illuminate an element illumination area corresponding to the element diffusion device;

wherein the light condensing optical system includes a lens, and the light diffusion device is located on a focus position of the lens;

wherein the element diffusion devices are arranged in a direction which is parallel to a scanning direction of the spot area; and wherein an effective scanning section along the scanning direction, in which the whole spot area is located only within one element diffusion device, is longer than an ineffective scanning section along the scanning direction, in which the spot area is located over two element diffusion devices that are adjacent in the scanning direction.

15. An illumination device comprising:

a light diffusion device including element diffusion devices that diffuse incident light;

a coherent light source that emits coherent light;

a shaping optical system that shapes the coherent light;

a scanner that adjusts a traveling direction of the coherent light so as to allow the coherent light to scan the light diffusion device; and a light condensing optical system located on a light path of the coherent light from the shaping optical system up to the light diffusion device;

wherein the light condensing optical system condenses the coherent light such that a spot area on the light diffusion device is smaller than the element diffusion device;

wherein each element diffusion device diffuses the coherent light incident thereon so as to illuminate an element illumination area corresponding to the element diffusion device;

wherein the shaping optical system includes a collimation lens, and a lens array located on a light path from the collimation lens up to the light condensing optical system;

wherein the element diffusion devices are arranged in a direction which is parallel to a scanning direction of the spot area; and wherein an effective scanning section along the scanning direction, in which the whole spot area is located only within one element diffusion device, is longer than an ineffective scanning section along the scanning direction, in which the spot area is located over two element diffusion devices that are adjacent in the scanning direction.

16. An illumination device comprising:

a light diffusion device including element diffusion devices that diffuse incident light;

a coherent light source that emits coherent light;

a shaping optical system that shapes the coherent light;

a scanner that adjusts a traveling direction of the coherent light so as to allow the coherent light to scan the light diffusion device; and a light condensing optical system located on a light path of the coherent light from the shaping optical system up to the light diffusion device;

wherein the light condensing optical system condenses the coherent light such that a spot area on the light diffusion device is smaller than the element diffusion device;

wherein each element diffusion device diffuses the coherent light incident thereon so as to illuminate an element illumination area corresponding to the element diffusion device;

wherein the shaping optical system has a beam homogenizer;

wherein the element diffusion devices are arranged in a direction which is parallel to a scanning direction of the spot area; and wherein an effective scanning section along the scanning direction, in which the whole spot area is located only within one element diffusion device, is longer than an ineffective scanning section along the scanning direction, in which the spot area is located over two element diffusion devices that are adjacent in the scanning direction.

17. An illumination device comprising:

a light diffusion device including element diffusion devices that diffuse incident light;

a coherent light source that emits coherent light;

a shaping optical system that shapes the coherent light;

a scanner that adjusts a traveling direction of the coherent light so as to allow the coherent light to scan the light diffusion device;

a light condensing optical system located on a light path of the coherent light from the shaping optical system up to the light diffusion device; and an emission control unit that controls emission of the coherent light from the coherent light source, wherein the light condensing optical system condenses the coherent light such that a spot area on the light diffusion device is smaller than the element diffusion device;

wherein each element diffusion device diffuses the coherent light incident thereon so as to illuminate an element illumination area corresponding to the element diffusion device;

wherein the element diffusion devices are arranged in a direction which is parallel to a scanning direction of the spot area; and wherein an effective scanning section along the scanning direction, in which the whole spot area is located only within one element diffusion device, is longer than an ineffective scanning section along the scanning direction, in which the spot area is located over two element diffusion devices that are adjacent in the scanning direction.

* * * * *